US009483881B2

(12) United States Patent
Comeau et al.

(10) Patent No.: US 9,483,881 B2
(45) Date of Patent: Nov. 1, 2016

(54) SYSTEM AND METHOD FOR TESTING VEHICLE EMISSIONS AND ENGINE CONTROLS USING A SELF-SERVICE ON-BOARD DIAGNOSTICS KIOSK

(75) Inventors: David Arthur Comeau, Sussex, WI (US); Timothy E. Schwantes, Sussex, WI (US); Timothy J. Raml, Pewaukee, WI (US); Gregory A. Werner, Hartford, WI (US); Mark J. Werner, Sussex, WI (US); Victor E. McCartney, Brown Deer, WI (US); William D. Nicholson, Waukesha, WI (US)

(73) Assignee: APPLUS TECHNOLOGIES INC., Chicago, IL (US)

( * ) Notice: Subject to any disclaimer, the term of this patent is extended or adjusted under 35 U.S.C. 154(b) by 1723 days.

(21) Appl. No.: 12/476,995

(22) Filed: Jun. 2, 2009
(Under 37 CFR 1.47)

(65) Prior Publication Data

US 2010/0204876 A1 Aug. 12, 2010

Related U.S. Application Data

(63) Continuation-in-part of application No. 11/535,464, filed on Sep. 26, 2006, now Pat. No. 7,925,399.

(60) Provisional application No. 60/596,470, filed on Sep. 26, 2005.

(51) Int. Cl.
*G01M 17/00* (2006.01)
*G06F 17/00* (2006.01)
(Continued)

(52) U.S. Cl.
CPC .......... *G07C 5/008* (2013.01); *G07C 9/00158* (2013.01); *G07C 2205/02* (2013.01)

(58) Field of Classification Search
USPC ...... 701/29.1, 29.6, 30, 31.4, 32.6, 32.8, 33, 701/33.2, 33.4, 33.5; 340/5.83; 235/380
See application file for complete search history.

(56) References Cited

U.S. PATENT DOCUMENTS 4,754,519 A 7/1988 Duran et al.
4,757,463 A 7/1988 Ballou et al.

(Continued)

OTHER PUBLICATIONS

International Search Report and Written Opinion for PCT/US10/36988, dated Jul. 28, 2010 (7 pages).

(Continued)

*Primary Examiner* — Mussa A Shaawat
*Assistant Examiner* — Kyung Kim
(74) *Attorney, Agent, or Firm* — Polsinelli PC

(57) ABSTRACT

A system and method for testing vehicle emissions and engine control components using a standalone self-service kiosk. The self-service kiosk includes a computer capable of gathering Vehicle Information (VIN) and OBD information from a vehicle being tested using a barcode reader and an OBD reader, respectively. The self-service kiosk generates a readable display or printed report to the user indicating any detected diagnostic trouble codes found during the vehicle emissions testing. By networking a plurality of self-service kiosks together in a secure network and accessible through the Internet, the self-service kiosk network maintains a centrally located vehicle information database for storing and retrieving pertinent vehicle-related information during vehicle emissions testing. If the vehicle being tested passes the vehicle emissions testing, then the self-service kiosk prints out a registration renewal sticker, registration renewal document and/or receipt for the user.

20 Claims, 28 Drawing Sheets

(51) Int. Cl.

| | |
|---|---|
| ***G05B 19/00*** | (2006.01) |
| ***G07C 5/00*** | (2006.01) |
| *G07C 9/00* | (2006.01) |

(56) References Cited

U.S. PATENT DOCUMENTS

| | | | | |
|---|---|---|---|---|
| 4,956,783 | A | 9/1990 | Teranishi et al. | |
| 4,970,655 | A | 11/1990 | Winn et al. | |
| 5,055,657 | A | 10/1991 | Miller et al. | |
| 5,343,906 | A | 9/1994 | Tibbals, III | |
| 5,729,452 | A * | 3/1998 | Smith et al. | 701/31.9 |
| 5,874,722 | A | 2/1999 | Rando et al. | |
| 5,978,495 | A | 11/1999 | Thomopoulos et al. | |
| 6,006,147 | A * | 12/1999 | Hall et al. | 701/33.2 |
| 6,064,970 | A | 5/2000 | McMillan et al. | |
| 6,363,299 | B1 | 3/2002 | Hartsell, Jr. | |
| 6,449,142 | B1 | 9/2002 | Wu | |
| 6,466,842 | B1 | 10/2002 | Hartsell, Jr. | |
| 6,522,947 | B1 | 2/2003 | Hartsell, Jr. | |
| 6,529,808 | B1 | 3/2003 | Diem | |
| 6,604,033 | B1 | 8/2003 | Banet et al. | |
| 6,611,740 | B2 | 8/2003 | Lowrey et al. | |
| 6,636,790 | B1 | 10/2003 | Lightner et al. | |
| 6,732,031 | B1 | 5/2004 | Lightner et al. | |
| 6,732,032 | B1 | 5/2004 | Banet et al. | |
| 6,775,602 | B2 | 8/2004 | Gordon, Jr. et al. | |
| 6,810,309 | B2 | 10/2004 | Sadler et al. | |
| 6,816,760 | B1 | 11/2004 | Namaky | |
| 6,822,582 | B2 | 11/2004 | Voeller et al. | |
| 6,836,708 | B2 | 12/2004 | Tripathi | |
| 6,868,386 | B1 | 3/2005 | Henderson et al. | |
| 6,879,894 | B1 | 4/2005 | Lightner et al. | |
| 6,928,348 | B1 | 8/2005 | Lightner et al. | |
| 6,977,612 | B1 | 12/2005 | Bennett | |
| 7,031,828 | B1 | 4/2006 | Thompson et al. | |
| 7,089,099 | B2 | 8/2006 | Shostak et al. | |
| 7,107,220 | B2 | 9/2006 | Novack et al. | |
| 7,124,058 | B2 | 10/2006 | Namaky et al. | |
| 7,347,368 | B1 * | 3/2008 | Gravelle | G06Q 20/20<br>235/380 |
| 7,469,171 | B2 | 12/2008 | Tefft et al. | |
| 2002/0007237 | A1 | 1/2002 | Phung et al. | |
| 2002/0123833 | A1 | 9/2002 | Sakurai et al. | |
| 2002/0138185 | A1 | 9/2002 | Trsar et al. | |
| 2003/0130774 | A1 | 7/2003 | Tripathi et al. | |
| 2003/0174256 | A1 | 9/2003 | Kim et al. | |
| 2003/0176957 | A1 | 9/2003 | Namaky et al. | |
| 2003/0204290 | A1 | 10/2003 | Sadler et al. | |
| 2004/0039509 | A1 | 2/2004 | Breed | |
| 2004/0041689 | A1 | 3/2004 | DeBono | |
| 2004/0125993 | A1 | 7/2004 | Zhao et al. | |
| 2004/0130442 | A1 | 7/2004 | Breed et al. | |
| 2004/0227523 | A1 | 11/2004 | Namaky | |
| 2005/0043868 | A1 | 2/2005 | Mitcham | |
| 2005/0182537 | A1 | 8/2005 | Tefft et al. | |
| 2005/0192705 | A1 | 9/2005 | Pinney et al. | |
| 2005/0192727 | A1 | 9/2005 | Shostak et al. | |
| 2006/0025897 | A1 | 2/2006 | Shostak et al. | |
| 2006/0036442 | A1 | 2/2006 | Novack et al. | |
| 2006/0098403 | A1 * | 5/2006 | Smith | G06F 1/16<br>361/679.08 |
| 2006/0227366 | A1 | 10/2006 | Hohensee et al. | |
| 2006/0255967 | A1 | 11/2006 | Woo et al. | |
| 2007/0038434 | A1 | 2/2007 | Cvetko | |
| 2007/0083306 | A1 | 4/2007 | Comeau | |

OTHER PUBLICATIONS

State of Oregon, Department of Administrative Services (DAS), Request for Proposal #102-7505-4; Motor Vehicle Inspection System Upgrade for the Department of Environmental Quality (DEQ); Dec. 6, 2004; 51 pages.

State of Oregon, Department of Environmental Quality Memo; Subject: Agenda Item C, Rule Adoption: On-Road Clean Screening and Self-Testing of Vehicles, Oct. 9-10, 2003 EQC Meeting; Sep. 18, 2003; 45 pages.

State of Oregon, Department of Environmental Quality, Notice of Proposed Rulemaking, Vehicle Inspection Program Rule Proposal—On-Road Clean Screening and Self-Service Testing of Vehicles, Apr. 15, 2003; 55 pages.

Transportation Systems Branch Environment Canada, On-Board Diagnostics II (OBDII) and Light-Duty Vehicle Emission Related Inspection and Maintenance (UM) Programs, Apr. 2004; 92 pages.

United States Environmental Protection Agency, Air and Radiation, Performing Onboard Diagnostic System Checks as Part of a Vehicle Inspection and Maintenance Program, Jun. 2001, 37 pages.

International Search Report and Written Opinion for International Application No. PCT/US10/36988 dated Jul. 28, 2010.

* cited by examiner

SYSTEM AND METHOD FOR TESTING VEHICLE EMISSIONS AND ENGINE CONTROLS USING A SELF-SERVICE ON-BOARD DIAGNOSTICS KIOSK

CROSS REFERENCE TO RELATED APPLICATION

This is a continuation-in-part of U.S. application Ser. No. 11/535,464 filed on Sep. 26, 2006, which claims benefit of U.S. Provisional Application No. 60/596,470 filed on Sep. 26, 2005.

FIELD

This document relates to vehicle emissions and engine control testing equipment, and more particularly to a self-service on-board diagnostics kiosk that provides vehicle emissions testing, registration renewal and offers for government-related permits.

BACKGROUND

During the 1970s and 1980s, vehicle manufacturers began to use electronic systems to control engine functions and diagnose engine problems in an attempt to meet federal emissions standards set up by the Environmental Protection Agency (EPA). In the mid-1980's, the California Air Resources Board (CARB) approved a set of regulations requiring vehicles to be equipped with On-Board Diagnostic (OBD) systems to control and regulate emission and engine-control related components. The OBD system included circuitry and other electromechanical components that recorded engine and emission-related malfunctions using diagnostic trouble codes (DTCs). Stored in memory, the DTCs could later be retrieved by technicians to quickly determine the direct cause of the malfunctions and make necessary repairs.

OBD systems installed on vehicles included, among other things, an engine control module that monitored the engine controls and emission related components, a malfunction indicator lamp (MIL) located on an instrument panel and other supporting circuitry and memory. When a malfunction was detected by the OBD system, the MIL illuminated to provide notice to the vehicle operator of an engine or emissions malfunction. At the same time, the OBD system stored in memory the DTCs corresponding to the specific malfunction detected.

In addition to standard tailpipe testing equipment that measured exhaust output and content, state emission testing facilities were subsequently equipped with OBD-equipment that connected to the OBD system of a vehicle and retrieved stored DTCs by way of a data link connector (DLC). As a consequence, inspection and maintenance programs could quickly and efficiently determine whether a vehicle's specific engine control and emission system was functioning normally. For instance, to detect whether the engine control system of the OBD was functioning normally, an inspector could perform a standard key on engine off (KOEO) test by examining the responsiveness of the MIL under KOEO conditions. By retrieving the DTCs stored by OBD systems, an inspector could similarly review a history of generated trouble codes and diagnose the vehicle's road-worthiness.

In the late 1980's and early 1990's California developed and approved a new set of regulations, a second-generation OBD system (OBD-II) for use in newly manufactured vehicles. OBD-II built upon the first generation OBD system and incorporated various technical advancements including, among other things, the ability to monitor engine misfires and catalysts efficiencies. Although the first and second-generation of OBD regulations were originally only required in California, Federal emission regulations quickly followed. Operating under the framework of the Clean Air Act of 1990, the EPA adopted California's OBD-II regulations in the mid-1990s and required certain vehicles manufactured in 1996 and later to be equipped with OBD-II systems. In addition to requiring OBD-II systems, the Clean Air Act requires states to perform vehicle checks of OBD-II systems by way of mandatory programs that read generated DTCs and indicate whether the vehicle is safe and robust in terms of today's emission control standards. As of 1998, the EPA adopted new Federal OBD-II standards based on California's OBD-II regulations for certain newly manufactured vehicles.

Prior to adoption of the Federal standards, states typically utilized standard tailpipe testing equipment to evaluate and determine whether the exhaust volume and content met prescribed limits. Unlike traditional tailpipe tests, mandatory inspection and maintenance programs using OBD-II systems look for broken or malfunctioning emissions control components and detect potential or existing malfunctions before it leads to higher vehicle emissions. As a result, OBD-II technology benefits motorists, repair technicians and the environment. Motorists benefit because it monitors vehicle's performance each time the vehicle is driven and immediately identifies problems, allowing service to be performed before serious problems develop. Repair technicians benefit because it enables them to accurately and quickly diagnose problems by downloading DTCs through a data link connector (DLC). Lastly, because the OBD-II system identifies problems that cause increased vehicle emissions, the environment benefits from a lack of pollutants.

As emission and engine maintenance technology has improved from the 1970s to the present, Federal and state governments have adopted new technologies to measure vehicle emissions and keep our vehicles cleaner and safer. As a result of first and second generation OBD systems, tailpipe analyzer tests and legacy equipment are no longer required for vehicles manufactured in 1996 and later. While such testing has become standard across the United States, state-run facilities generally include complicated testing protocols and methodologies and expensive and mandated ancillary equipment to read and interpret DTCs. While individual vehicle owners may utilize state-run facilities to receive feedback based upon their vehicle's emissions and engine performance, the inspection and maintenance programs are generally not required for each vehicle until a vehicle reaches a prescribed age. Because state facilities are generally not available to the casual user or are inconveniently located, private manufacturers have marketed custom software and hardwired OBD testing equipment. While vehicle owners no longer need to visit state-run facilities to perform engine and emissions tests, the equipment sold by private manufacturers may not be economical, streamlined or user-friendly. In addition, such equipment is limited strictly to performing engine and emissions testing with no other functionalities provided to the user outside of emissions testing, such as registration renewal and issuance of state related permits.

Therefore, a need exists for OBD testing equipment which features state-of-the-art equipment allowing user-friendly testing processes to encourage self-service testing practices among vehicle owners and/or trained vehicle inspectors. It is further noted that current OBD testing equipment has few, if any, security systems in place to prevent fraudulent reporting of engine and emissions data and thus is susceptible to abuse. Accordingly, a further need exits for OBD testing equipment having security and/or tamper-resistant features designed to alleviate this problem. There also exists a need for an OBD testing equipment having other functionalities in addition to engine and emissions testing, such as registration renewal and issuance of state regulated permits.

SUMMARY

In an embodiment, a self-service kiosk may include a standalone cabinet including a computer having a processor for processing information, a storage device for storing information related to a vehicle record and/or a test record for a vehicle being tested, and a printer for printing one or more documents. The cabinet may further include a vehicle information number (VIN) reader for retrieving vehicle information related to the vehicle being tested and an on-board diagnostic (OBD) reader for retrieving information from an OBD system of the vehicle being tested, wherein the computer is responsive to conducting an emissions testing of the vehicle being tested such that the vehicle being tested is provided with either a rejecting status or passing status by the computer based on the results of the emissions testing, wherein if the vehicle being tested is provided a passing status by the computer for the emissions testing of the vehicle being tested, the computer instructs the printer to print out a registration renewal sticker signifying the passing status of the vehicle being tested.

In another embodiment, a self-service kiosk for conducting emissions testing and registration renewal may include a standalone cabinet having a processor for processing information, and a storage device for storing information related to a vehicle record and/or a test record for a vehicle being tested. The standalone cabinet may further include a vehicle information number (VIN) reader for retrieving vehicle information related to the vehicle being tested, and an on-board diagnostic (OBD) reader for retrieving information from an OBD system of the vehicle being tested. The processor may be responsive to conducting an emissions testing of the vehicle being tested such that the vehicle being tested is provided with either a rejecting status or passing status based on information from the OBD system of the vehicle being tested, wherein if the vehicle being tested is provided a passing status for the emissions testing of the vehicle being tested, the processor generates a registration renewal for the vehicle being tested and stores the registration renewal in the storage device.

In yet another embodiment, a method for registration renewal and testing vehicle emissions may include capturing and verifying user information; capturing vehicle information number (VIN) information of a vehicle being tested; capturing OBD-related information stored on an OBD system of the vehicle being tested; processing the OBD-related information stored on the OBD system and generating test results based on the OBD-related information; comparing the test results to registration renewal criteria; and printing out registration renewal stickers for the vehicle being tested if the test results meet the registration renewal criteria.

Additional objectives, advantages and novel features will be set forth in the description which follows or will become apparent to those skilled in the art upon examination of the drawings and detailed description which follows.

BRIEF DESCRIPTION OF THE DRAWINGS

Corresponding reference characters indicate corresponding elements among the view of the drawings. The headings used in the figures should not be interpreted to limit the scope of the claims.

DETAILED DESCRIPTION

Figure 1:
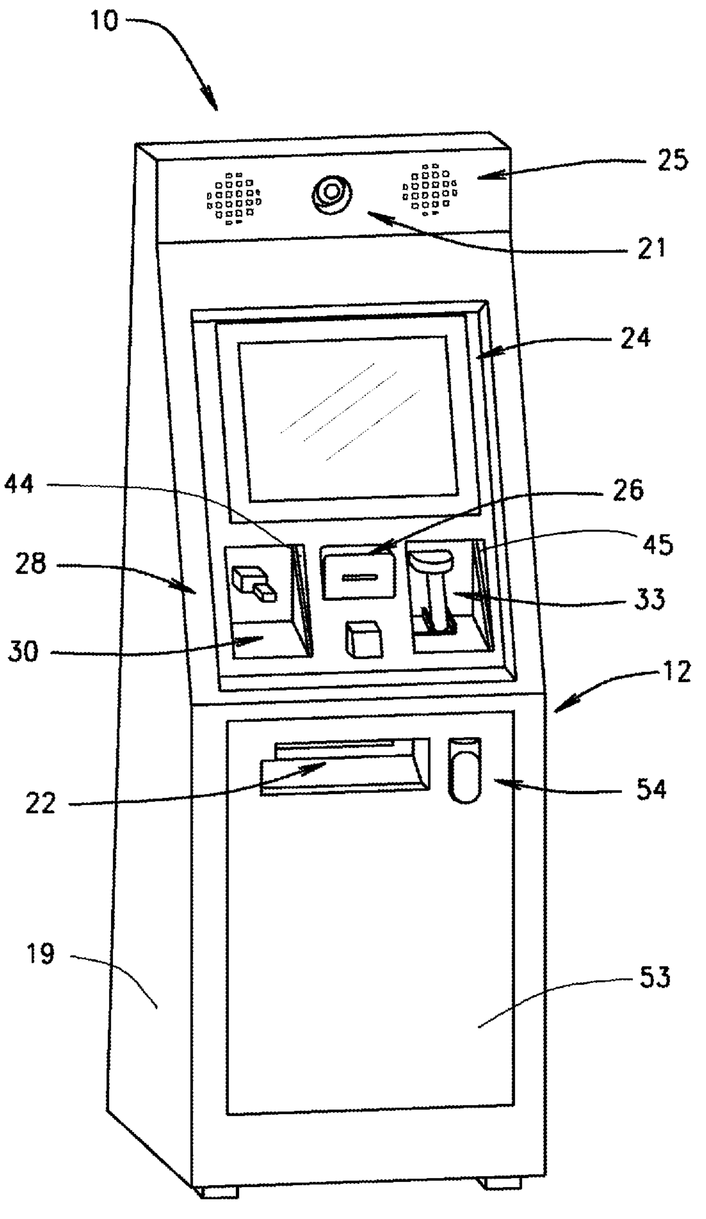
FIG. 1 is a perspective view of an embodiment of a self-service kiosk.

Referring to the drawings, an embodiment of a self-service kiosk system is illustrated and generally indicated as 10 in FIGS. 1-27. In one aspect shown in FIGS. 1-3, the self-service kiosk system 10 allows a user to administer a vehicle emissions test for the user's vehicle at a self-service kiosk 12 without an attendant being present. In another aspect, the self-service kiosk 12 may have the capability to employ and interact with an attendant during operation of the self-service kiosk system 10.

Figure 2:
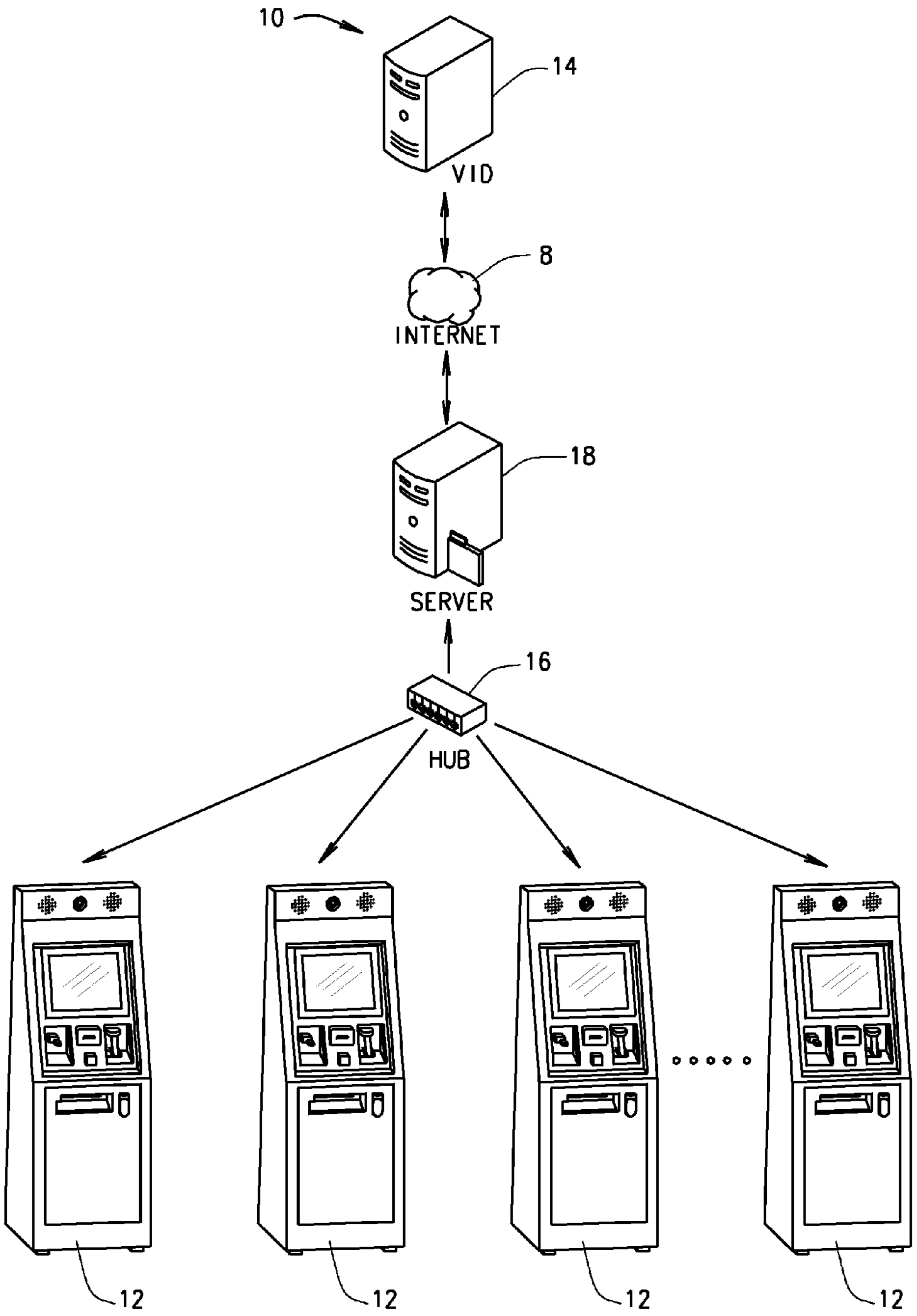
FIG. 2 is a simplified illustration of one embodiment of a self-service kiosk network having a plurality of self-service kiosks in a self-service kiosk system.
Figure 3:
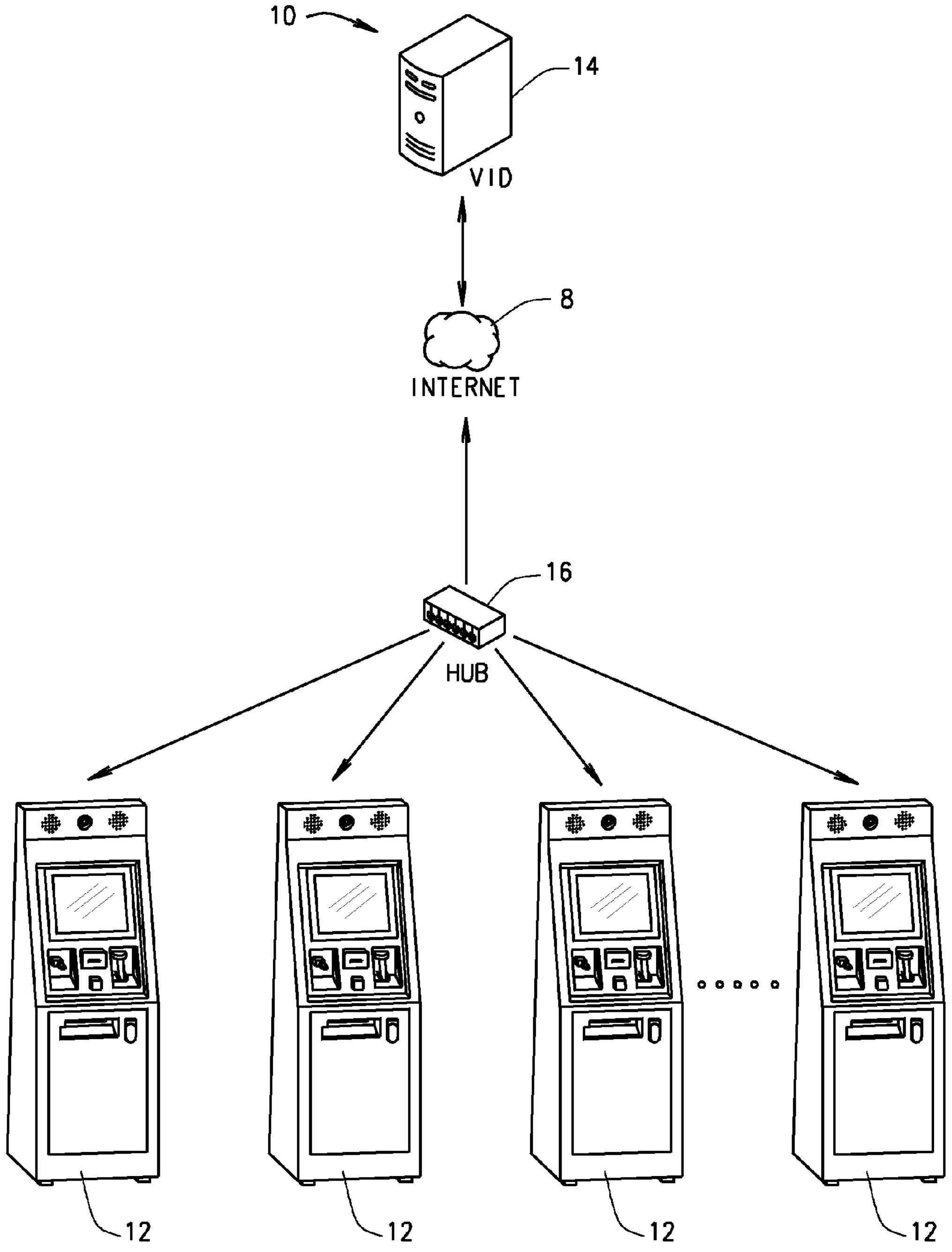
FIG. 3 is a simplified illustration of another embodiment of the self-service kiosk network.

In one embodiment shown in FIG. 2, self-service kiosk system 10 may include one or more self-service kiosks 12 that communicate with a remote vehicle information database 14 through a hub subsystem 16 via the Internet 8. In another embodiment shown in FIG. 3, the hub subsystem 16 is in communication with each of a plurality of self-service kiosks 12 which may communicate with the vehicle information database 14 through a central server 18. However, it is contemplated that other network configurations for establishing communication between one more self-service kiosks 12 with the vehicle information database 14 for retrieving vehicle and/or user related information.

As shown in FIG. 1, one embodiment of the self-service kiosk 12 may include a standalone cabinet 19 having a securable door 53 with a door lock 54 that permits the door to be locked to protect the equipment, components and modules that constitute the self-service kiosk 12 from being tampered. The door 53 may further include a printer slot 43 that communicates with a printer 22 (FIG. 4) for printing and dispensing documents, such as receipts, official permits, registration renewal forms, registration tags and/or other types of documents and reports.

In one embodiment, the self-service kiosk 12 may further include a finger scanner 27 for user identification, and OBD interface 28 having an OBD reader 46 for establishing communication with a vehicle's OBD computer (not shown) during vehicle engine and emissions testing, an OBD-II hardware tester 29 for testing the OBD circuitry to ensure compliance with predetermined standards, a monitor 24 for providing a user interface and/or display for the user to interact and communicate with the self-service kiosk 12, and a speaker subsystem 25 may include one or more speakers for providing suitable audible reproduction of, for example, audio instructions and messages to the user, alarm(s)d language and other types of audible sounds.

The self-service kiosk 12 may further include a credit card reader 26 for reading the user's credit card for providing payment by the user, a camera 21 for providing surveillance and a visual record of the surrounding area of the self-service kiosk 12, and a barcode reader 33 for reading the VIN of the vehicle. Camera 21 may include any suitable video or still frame camera for communicating close-range video images or picture images of the self-service kiosk 12 and/or the vehicle to the processor 35. As understood, the processor 35 may store the images in any suitable memory and may be useful for security purposes or for identification of the user, operator and/or vehicle. The credit card reader 26 may be coupled to the bus 34 via I/O ports 39 for communicating or identifying (i.e., collecting) credit card or other suitable payment information about the user to the computer 15. In one embodiment, the barcode scanner 33 may be a Symbol wireless 1D barcode scanner model LS3478, although other suitable barcode scanners for reading the barcode for the VIN are contemplated.

In addition, the self-service kiosk 12 may include one or more manual input device(s) 23, such as a mouse, keyboard or touch screen for communicating command selections to processor 35 and/or for controlling cursor movement on monitor 24 and to allow the user to interact with the kiosk 12. An indicator light 32 may also be included to provide the user with a visual signal related to the operation of the kiosk 12, such as an alarm or activation status. In one embodiment, the monitor 24 may be an integrated monitor and manual input device to provide touch screen capabilities. As understood by one of ordinary skill in the art, integrated monitor and manual input device may accept and detect user input via, for example, physical contact/pressure applied to the screen by way of a human appendage (e.g., an index finger) or a stylus. In one embodiment, the monitor 24 provides a graphical user interface having a keyboard layout displayed for the user. The monitor 24 may be a cathode ray tube (CRT), a digital flag panel display (e.g., a plasma display, a LCD display, etc.) or any other suitable display monitor capable of visibly reproducing video and graphic information. In one embodiment, the monitor 24 may be a 15 inch touch screen monitor having a resolution of 1024×768 and a dot pitch of 0.28 mm having either a VGA or Serial connectivity.

In one embodiment, a security door assembly 30 having first and second sliding security doors 44 and 45, may be provided to shield and protect the OBD interface 28, OBD reader 46 and barcode scanner 33, respectively, that are housed in recesses defined by the standalone cabinet 19. For example, first sliding security door 44 may be selectively opened after the user identification has been established via fingerprint scanner 27 and/or payment information collection has been completed using credit card reader 26. When the first sliding security door 44 is open, the OBD reader 46 may be accessed. The OBD reader 46 may be adapted for connection with the OBD connection site on the vehicle for establishing communication with the OBD computer (not shown) of the vehicle being tested. Upon completion, the first sliding security door 44 may slide to the closed position to protect the OBD interface 28. OBD interface 28 may include a holster equipped with a sensor capable of detecting return of the OBD reader 46 to the OBD interface 28. Similarly, the second sliding door 45 may also be selectively opened such that the barcode scanner 33 may be used to scan the VIN of the vehicle being tested. Once the barcode scanner 33 has been used and returned to the recess the second sliding security door 45 may be closed. The barcode scanner 33 may also include a holster equipped with a sensor capable of detecting the return of the barcode reader 33. Alternatively, the self-service kiosk 12 via the monitor 24 may prompt the user to confirm receipt of the OBD reader 46 and barcode scanner 33. In this manner, the selective opening and closing of the first and second sliding security doors 44 and 45 appear automatic to the user.

The OBD reader 46 and barcode scanner 33 may be any suitable reader device used to obtain OBD-system-generated information and VIN information regarding a particular vehicle under test. In addition, the fingerprint scanner 27 may be any suitable device used for identifying a vehicle owner or attendant administering a vehicle test upon a given vehicle. In one embodiment, the fingerprint scanner 27 is an integral portion of the self-service kiosk 12 or may be a separate stand-alone component of the kiosk 12. Fingerprint scanner 27 may be particularly relevant to self-service kiosks 12 designed for approved trained inspectors or for vehicle owners and may be used as a password to log into the self-service kiosk system 10 or as a method of fraud detection. In one embodiment, users of the self-service kiosk 12 could be registered in advance by having a finger scan saved and thereby act as a password that is stored in the storage device 37 of the computer 15. In another embodiment, fingerprint scanner 27 may be used to scan a user's fingerprint for storage with a vehicle inspection record stored in the vehicle information database 14.

Figure 6:
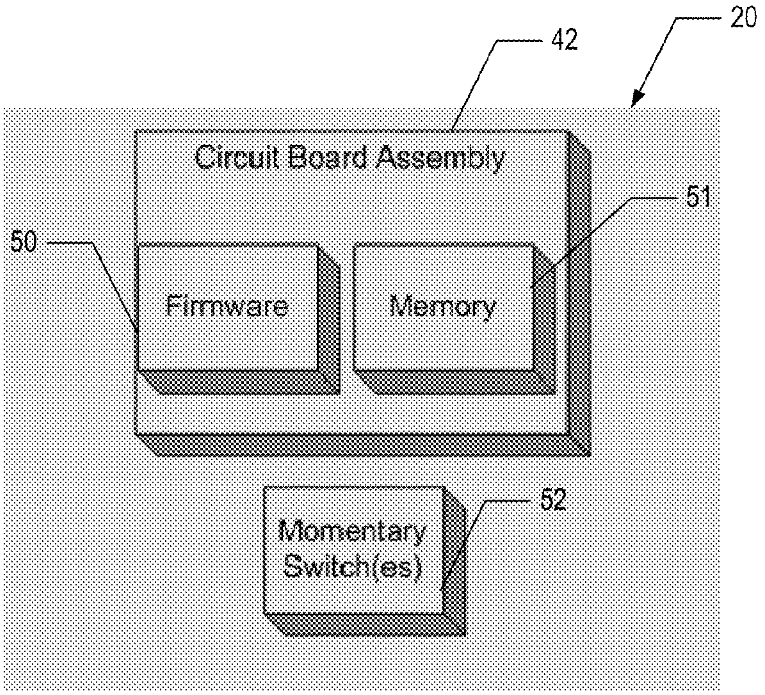
FIG. 6 is a simplified block diagram illustrating the various components of the anti-tampering module for the self-service kiosk.

In one embodiment, the self-service kiosk 12 may include an anti-tampering module 20 that prevents tampering to the self-service kiosk 12. As shown in FIG. 6, the self-service kiosk 12 may have a circuit board assembly 42 that includes firmware 50 in communication with memory 51 for detecting the actuation of one or more switches 52. The switches 52 have two states—opened and closed. The firmware 50 contained in memory 51 constantly monitors the state of the switches 52. When a change in state of any switch 52 occurs (or when requested from an external source), an event is transmitted from the serial port (or USB) on the circuit board assembly 42 and to the computer 15. In operation, the computer 15 manages the events and performs certain actions (lockouts, notifications, etc.) based on these events.

In one aspect, the standalone cabinet 19 enables the self-service kiosk 12 to be portable and may therefore be placed in any suitable location or environment. In one embodiment, the standalone cabinet 19 is a waterproof cabinet capable of repelling moisture and water and may also contain a climate and/or temperature controlled system 31, such as a combination air conditioning and heating unit, capable of keeping the components of the self-service kiosk 12 at a suitable temperature or humidity under one or more adverse conditions. It is contemplated that the self-service kiosk 12 may include any number of the above components and that in one embodiment, the kiosk 12 may be of modular construction that permits the addition, deletion and exchange of modules in order to add, delete or switch out certain functionalities of the self-service kiosk 12.

Figure 4:
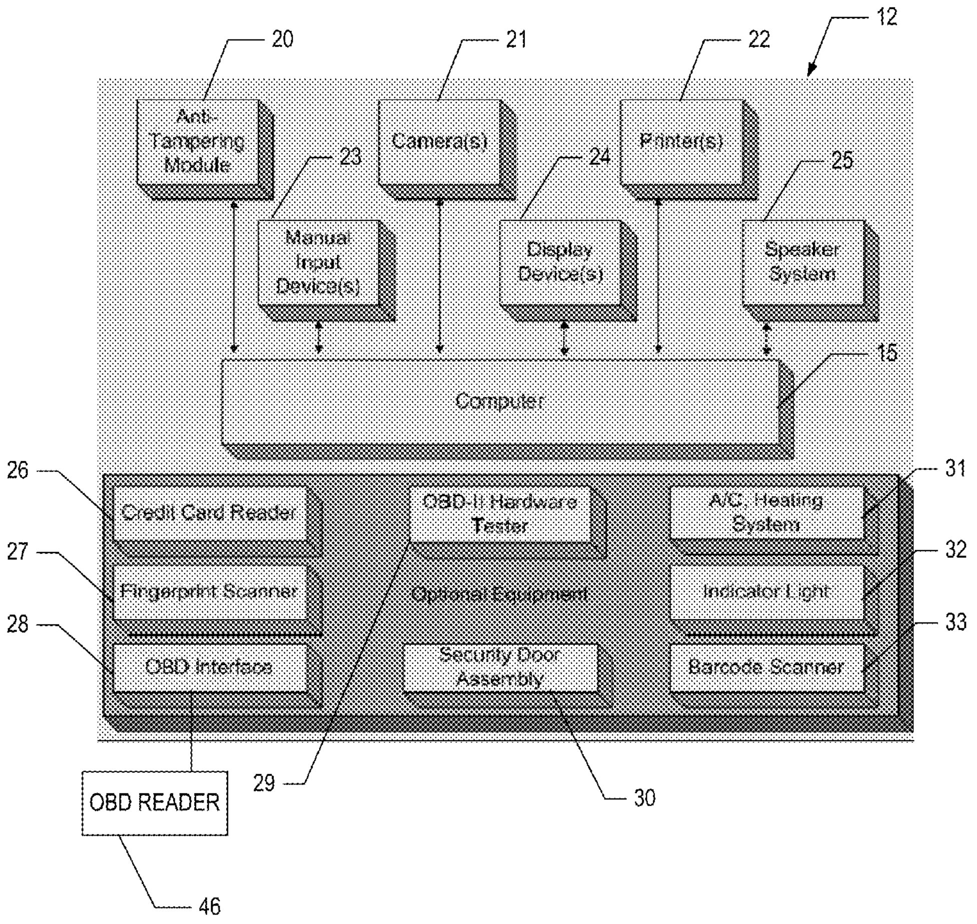
FIG. 4 is a simplified block diagram illustrating the various components of the self-service kiosk.
Figure 5:
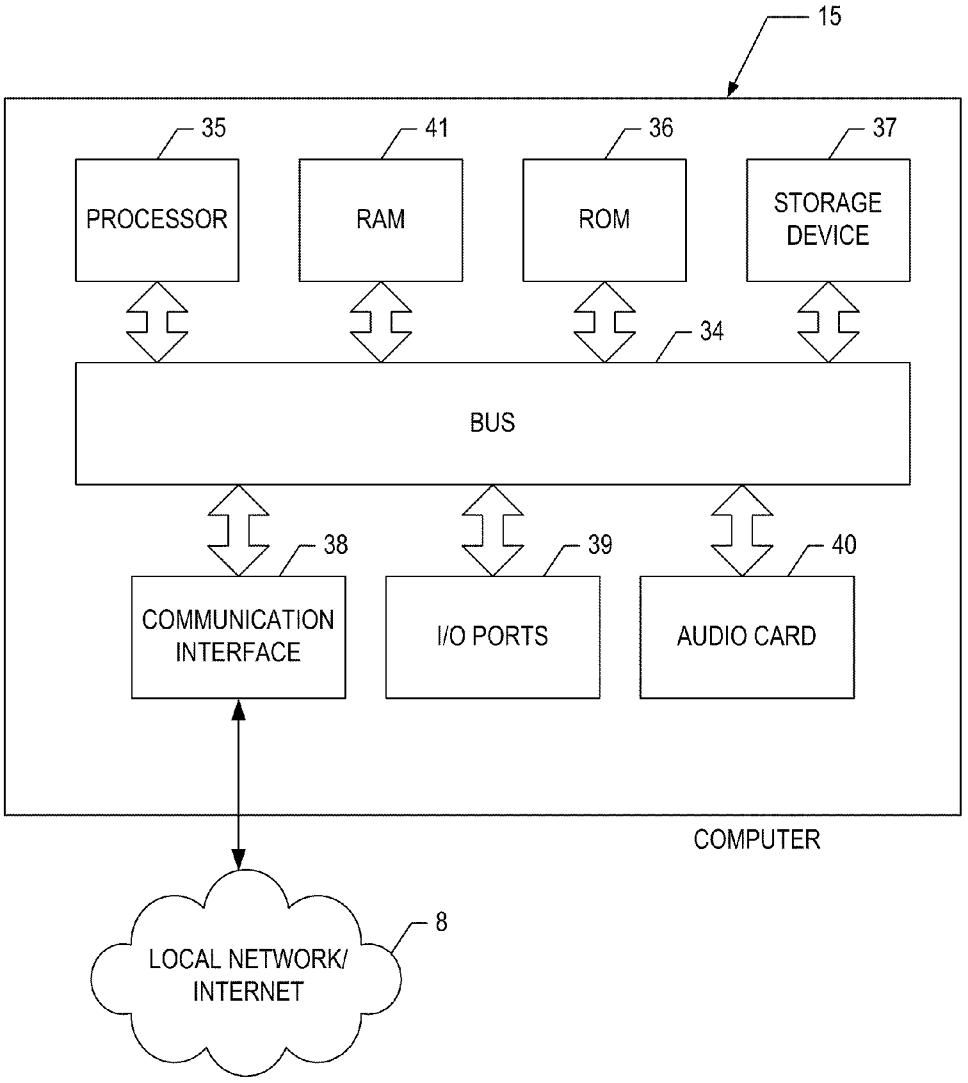
FIG. 5 is a simplified block diagram illustrating the various components of the computer for the self-service kiosk.

Referring back to FIG. 4, the various components of the self-service kiosk 12 operatively communicate with a computer 15 that may be any conventional computing device or system that computes such as, but not limited to, one or more integrated circuits or packages. As illustrated in FIG. 5, the computer 15 includes a bus 34 for communicating information and a processor 35 coupled to the bus 34 for processing information. Processor 35 may include one or more conventional processors, microprocessors, or processing device known in the art or may comprise any other suitable device such as, but not limited to, one or more ASICs, one or more DSPs, etc. For instance, processor 35 may be implemented using an Intel PENTIUM® processor. As further shown, computer 25 includes main memory 41, such as random access memory (RAM) or other dynamic storage device, couple to bus 34 for storing information and instructions to be executed by processor 35. Main memory 41 may be used for storing temporary variable or other intermediate information during execution of instructions to be executed by processor 35. Computer 15 may also include read only memory (ROM) 36 or other static storage device coupled to bus 34 for storing static information and instructions for processor 35 as well as a storage device 37, such as a magnetic disk or optical disk, that is coupled to bus 34 for storing information and instructions.

As shown, computer 15 may be coupled via bus 34 to one or more of the above-listed components of the self-service kiosk 12 through suitable input/output ports 39. Although not specifically illustrated, each of the above-listed components may also include any necessary support hardware (e.g., circuitry), software and/or firmware that enables the self-service kiosk 12 and its processor 35 to communicate with each component. For example, monitor 24 may include one or more frame buffers and may further require an additional graphics processing unit and an associated driver stored in RAM 41 or any other suitable memory to alleviate the burden associated with visual reproduction of images. Similarly, speaker subsystem 25 may be in operatively coupled with an audio card 40 as well as one or more digital-to-analog converters, and amplifiers. It is recognized that the above-listed supporting hardware, software and/or firmware are merely exemplary and are not intended to limit the breadth of the present disclosure.

According to one embodiment, the self-service kiosk 12 utilizes computer 15 to test vehicle engine and emission components by executing one or more sequences of one or more instruction commands contained in RAM 41 or any other suitable computer-readable medium. Such instructions may be read into RAM 41 from another computer-readable medium, such as storage device 37. Execution of the sequences of instructions contained in RAM 41 cause processor 35 to perform the processes and procedures described herein. In one embodiment, one or more processors 35 in a multi-processing arrangement may also be employed to execute the sequences of instructions contained in RAM 41. In alternate embodiments, hard-wired or any other suitable dedicated or programmable circuitry may be used in place or in combination with software instructions to implement the invention. Thus, embodiments of the invention are not limited to any specific combination of hardware, circuitry and software.

The terms "computer-readable medium" and "memory," as used herein, refer to any medium that participates in providing instructions to processor 35 for execution or to any medium that is capable of storing data. Such a medium may take many forms, including, but not limited to, non-volatile media, volatile media, and transmission media. Non-volatile media include, for example, optical or magnetic disks, such as storage device 37. Volatile media include dynamic memory, such as RAM 41, while transmission media may include coaxial cables, copper wire, and fiber optics, including the wires that comprise bus 34. Transmission media can also take the form of acoustic or light waves—such as those generated during radio frequency (RF) and infrared (IR) data communications. Common forms of computer-readable media include, for example, floppy disks, a flexible disk, hard disk, magnetic tape, any other magnetic medium, a CD-ROM, DVD, any other optical medium, punch cards-paper tape, any other physical medium with patterns or holes, a RAM, a PROM, a EPROM, a FLASHEPROM, any other memory chip or cartridge, a carrier wave as described hereinafter, or any other medium from which a computer can read.

Various forms of computer-readable media may be involved in carrying one or more sequences of one or more instructions to processor 35 for execution. For example, the instructions may initially be borne on a magnetic disk or any other suitable computer readable medium of a remote computer (not shown). The remote computer can load the instructions into its dynamic memory and send the instructions over a telephone line or any other suitable transmission line using, for example, a modem. In one embodiment, a modem local to computing device 15 may receive the data on a telephone line and use an infrared transmitter to convert the data to an infrared signal. An infrared detector (not shown) coupled to bus 34 receives the data carried in the infrared signal and places the data on bus 34. Bus 34 carries the data to RAM 41, from which processor 35 retrieves and executes the instructions. The instructions received by RAM 41 may optionally be stored in any suitable memory (e.g., RAM, 41 and/or storage device 37) either before or after execution by processor 35.

Figure 7:
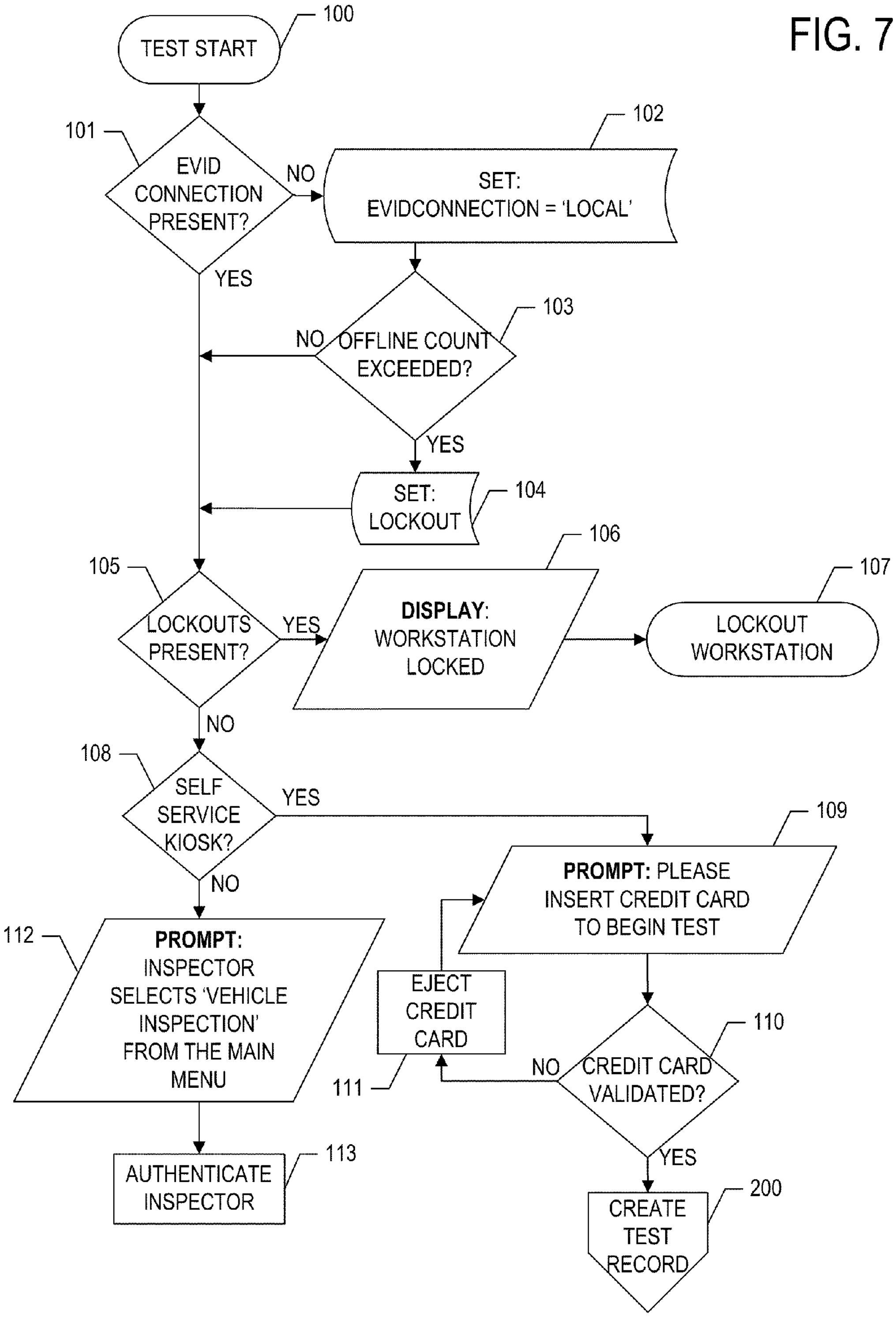
FIG. 7 is a flow chart illustrating a test startup procedure for the self-service kiosk.

Referring to FIGS. 5-7, computer 15 may also include a communication interface 38 that provides a two-way data communication coupling to the hub subsystem 16 that is connected to a network (local or remote) and/or Internet 8. For example, communication interface 38 may be an integrated services digital network (ISDN) card or a modem to provide a data communication connection to a corresponding type of telephone line or other suitable transmission line. As another example, communication interface 38 may be a local area network (LAN) card to provide a data communication connection to a compatible LAN. Wireless links and associated circuitry/equipment necessary for implementation may also be incorporated. In any such implementation, communication interface 38 may send and receive electrical, electromagnetic, optical or any other suitable signal that carries digital data streams representing various types of information.

Hub subsystem 16 typically provides data communication through one or more networks to other data devices. For example, hub subsystem 16 may provide a connection through a local network to a host computer or to data equipment operated by an Internet Service Provider (ISP). The ISP in turn provides data communication services through the Internet 8. The local network and Internet both use electrical, electromagnetic, optical or any other suitable signals that carry digital data or data streams.

Each of the self-service kiosks 12 may be loaded with Microsoft's .net framework version 2.0 or any other software platform enabling each of the self-service kiosk 12 to interact in a web-based environment. By utilizing these .net and other web-based technologies, the network of self-service kiosks 12 is scalable and easily adaptable to future growth. The vehicle information database 14 may be any external database accessible by each of the self-service kiosks 12 and other web-based clients on the Internet. In one embodiment, the vehicle information database 14 may be implemented using a Microsoft SQL Server as a backend stand-alone device.

In web-based self-service kiosk system 10, each of the self-service kiosks 12 may communicate with the vehicle information database 14 using the services of various .net technologies such as ASP.net, VB.net, C#, XML and other Web services. In this manner, each of the self-service kiosks 12 can issue requests for data stored in the vehicle information database. For instance, a self-service kiosk 12 may issue a request for vehicle-related information associated with a vehicle's VIN. In another embodiment, the self-service kiosks 12 may issue a request for information regarding a vehicle's previous testing history. While each of the self-service kiosks 12 may receive data from the vehicle information database 14, each kiosk 12 may also transmit data thereto. As described herein, a self-service kiosk 12 may store a vehicle's VIN or other related information (i.e., VLT-type information) in the vehicle information database 14. Alternatively, the self-service kiosk 12 may store test results to the vehicle information database 14. In another embodiment, the vehicle information database 14 is capable of storing information regarding legacy emission tests such as tailpipe tests in order to provide a complete history of a vehicle's emissions compliance.

By maintaining a secure self-service kiosk system 10, remote users located elsewhere on the Internet 8 can selectively access data stored within the secure network of system 10 by using standard Internet protocols. Other benefits include the ability to: add or remove kiosks from the system 10; view camera data at a selected kiosk from a remote location; send and retrieve VLT files from each self-service kiosk 12 or central vehicle information database (and associate scheduling); perform software updates remotely; use the back-end vehicle information database 14 to incorporate form-based authentication with options for role management; view canned reports remotely or at individual kiosks 12 indicating the number of tests performed between a given date range or the number of missed appointments; and selectively deactivate kiosks from remote locations.

Computer 15 can send messages, and receive data, including program codes through the network(s), hub subsystem 16 and communication interface 38. In the Internet example, the central server 18 (FIG. 2) might transmit a requested code for an application program through the Internet 8, ISP, local network and communication interface 38. One such downloaded application provides for the testing instructions for testing a vehicle's engine and emissions components as described herein. In one embodiment, the downloaded application may be executed by the processor 35 as the application is received, and/or stored in a storage device 37, or other volatile or non-volatile storage for later execution. In this manner, computer 15 may obtain an application code.

Although computer 15 is described above as having the above-listed components, it is recognized that one or more components may not be needed or substituted with an equivalent component. For instance, storage device 37 may be omitted. Similarly, while computer 15 is illustrated as having locally coupled components, it is recognized that one or more components may be remotely coupled to the computer 15 over a network or over the Internet 8 (e.g., over local network/internet 8). It is further recognized that one or more self-service kiosk components such as, for example, printer 22 may also be remotely coupled to the computer 15 over a network or over the Internet 8 (e.g., over local network/internet 426).

The self-service kiosk 12 may be utilized to read and analyze OBD-II computer based systems often termed an Engine Control Unit ("ECU") or a Powertrain Control Module ("PCM") built into vehicles, thereby providing the owner with engine and emission data captured by the vehicle's onboard system. In operation, the self-service kiosk 12 may have a program loaded from storage device 37 or any data source (e.g., computer readable medium) internal or external to computer 15 and subsequently generates and displays a graphical user interface on the monitor 24.

As recognized, the OBD-II standard allows a variety of electrical signaling protocols indicating how information is transmitted over the vehicle's data link connector (DLC). Known protocols include: SAE J1850 PWM (used in many Ford vehicles), SAE J1850 VPW (used in many GM vehicles), ISO 9141-2 (used in many Chrysler, European and Asian vehicles), ISO 14230 KWP2000, and ISO 15765 CAN. Using one of these protocols, a vehicle can "communicate" with the OBD Reader 46. In one embodiment, vehicle pertinent information includes the OBD-II protocol used by the vehicle being tested. If a Vehicle Lookup Table (located in any suitable memory of computer 15 or in any other data source internal or external to computer 15) includes this information, the OBD Reader 46 and/or computer 15 may be configured to read and/or interpret the OBD-related information transmitted over the DLC. In another embodiment, the user may be able to input the protocol used by the vehicle if known. The OBD Reader 46 also has the capability of transmitting requests using multiple OBD-II protocols simultaneously to determine the desired protocol of the ECU. This simultaneous capability allows for faster testing times and more productive through-put of information by the OBD Reader 46. In addition, the OBD Reader 46 can also communicate over multiple protocols simultaneously which allows the transmission of data from various, multiple sources (for example, an Engine Control Unit using the CAN bus 34 and a Transmission Control Module using the ISO 9141-2 bus 34

Once the OBD reader 46 is connected to the vehicle's DLC, standard inspection processes can be performed if the signaling protocol has been ascertained (as explained above). If the protocol is neither present in the VLT, manually entered, or otherwise made available, the OBD reader 46 is programmed to ascertain the proper protocol by testing the current vehicle using a known test program stored by computer 15. In one embodiment, the test program directs the OBD reader 46 to attempt communication with the vehicle's DLC with each known protocol until the proper protocol is found. Other known tests may also be employed. Once the protocol is ascertained by either manual input or by OBD reader 46, the VLT file is updated to speed up the time needed for subsequent inspections. In one embodiment, the protocol used during an inspection is saved or otherwise recorded in any suitable memory, such as RAM 41, storage device 37 or vehicle information database 14.

Standard inspection processes may include, among other inspection tests, a KOEO inspection (key-on, engine-off), a KOER inspection (key-on, engine-running) and another other suitable OBD inspection. As understood by those having ordinary skill in the art, diagnostic trouble codes ("DTC"), vehicle readiness codes, parameter identification ("PID") numbers and other suitable OBD-related date may be read by the OBD reader 46 during the inspection process and sent to computer 15 for analysis of the engine and emission control features of the vehicle and/or storage. After a test completes, the kiosk user is prompted to disconnect the OBD reader 46 from the DLC and return it to the self-service kiosk 12.

In the above description, the self-service kiosk 12 may prompt the user by way of graphical data presented on monitor 24. For example, visual images can be displayed to show how to connect the OBD reader 46 with the DLC of the vehicle being tested. In one embodiment, Macromedia's Flash software is utilized to generate animated images for display on monitor 24. The prompts may also take the form of audio commands delivered by speaker subsystem 25.

In one embodiment, RF technology may be utilized to not only send data to one or more RF readers on the self-service kiosk 12 but may also be utilized to write test result data and other vehicle-specific information from the self-service kiosk 12 to a RFID tag on the vehicle being tested. For instance, a vehicle undergoing an engine and emissions test may have an RFID tag or transponder located thereon. Among other things, the RFID tag may relay information to the self-service kiosk 12 indicating the VIN, OBD-related data or other vehicle-related information as described above. While the self-service kiosk 12 described above utilized a stand-alone barcode scanner 33 and a stand-alone OBD reader 46 as separate devices, the self-service kiosk 12 may also be equipped with a single combination VIN an OBD reader (not illustrated) such as a single RFID reader capable of reading any information contained on a vehicle's RFID tag. In one embodiment, the application working in conjunction with the RFID reader may continuously scan its environment for RFID tags and automatically open an RF portal for data transfer after a user enters their payment and/or other personal information. Additionally, the self-service kiosk 12 may have the ability to write data back to the vehicle's RFID tag. In such an embodiment, the self-service kiosk 12 may be programmed to write the test results back to the RFID tag such that the tag contains a history of the vehicle being tested.

Referring to FIGS. 7-25, the operation of the self-service kiosk system 10 will be discussed in greater detail. As shown in FIG. 7, the processor 35 initiates a TEST STARTUP procedure at block 100 that initiates the operation of the self-service kiosk 12. At decision point 101, system 10 determines whether a connection has been established with the vehicle information database 14. If a connection is established then at decision point 105, system 10 determines how many lockouts are present as shall be discussed below. If no connection has been established with the vehicle information database 14, at block 102 the system 10 writes in storage device 37 that communication has not been established with the vehicle information database 14 and to perform a predetermined number of offline tests prior to "locking out" the self-service kiosk 12. As used herein, the term "lock out" or "locking out" shall mean that the system 10 prevents the operation of the self-service kiosk 12 and/or disables other operational features, e.g., registration renewal, etc. At decision point 103, system 10 determines if the offline count has been exceeded. If the offline count has been exceeded, the system 10 locks out the self-service kiosk 12. If the offline count has not been exceeded, at decision point 105, system 10 determines whether any lockouts of the self-service kiosk 12 are present. In one aspect a lock out of the self-service kiosk 12 can occur due to kiosk tampering, equipment failure, etc. having occurred. If so, at block 106 the monitor 24 displays "WORKSTATION LOCKED" and at block 107 the lockout condition of the self-service kiosk 12 is provided to prompt an attendant. The attendant may then unlock the self-service kiosk 12 to once again enable operation and to perform a non self-service operation with the attendant assisting the user to operate the self-service kiosk 12.

However, if no lockouts are present at decision point 105 then at decision point 108 the system 10 determines whether a self-service kiosk 12 is present. If a self-service kiosk 12 is detected, then at block 109 the monitor 24 displays "PLEASE INSERT CREDIT CARD TO BEGIN TEST" to prompt the user to begin the operation of the self-service kiosk 12 in a self-service mode. At decision point 110, the system 10 determines whether the credit card inserted into the credit card reader 26 is valid. If the credit card is not valid, then the credit card is ejected at block 111 and the system 10 returns to block 109 to again prompt the user to insert a credit card. If the credit card is valid, then the system 10 proceeds to CREATE TEST RECORD procedure at block 200 illustrated in FIG. 8.

If no self-service kiosk 12 is present at decision point 108 then the monitor 24 prompts the attendant or inspector to select "VEHICLE INSPECTION" from the Main Menu in monitor 24. At block 113 the system 10 authenticates the identity of the attendant operating the self-service kiosk 12.

Figure 8:
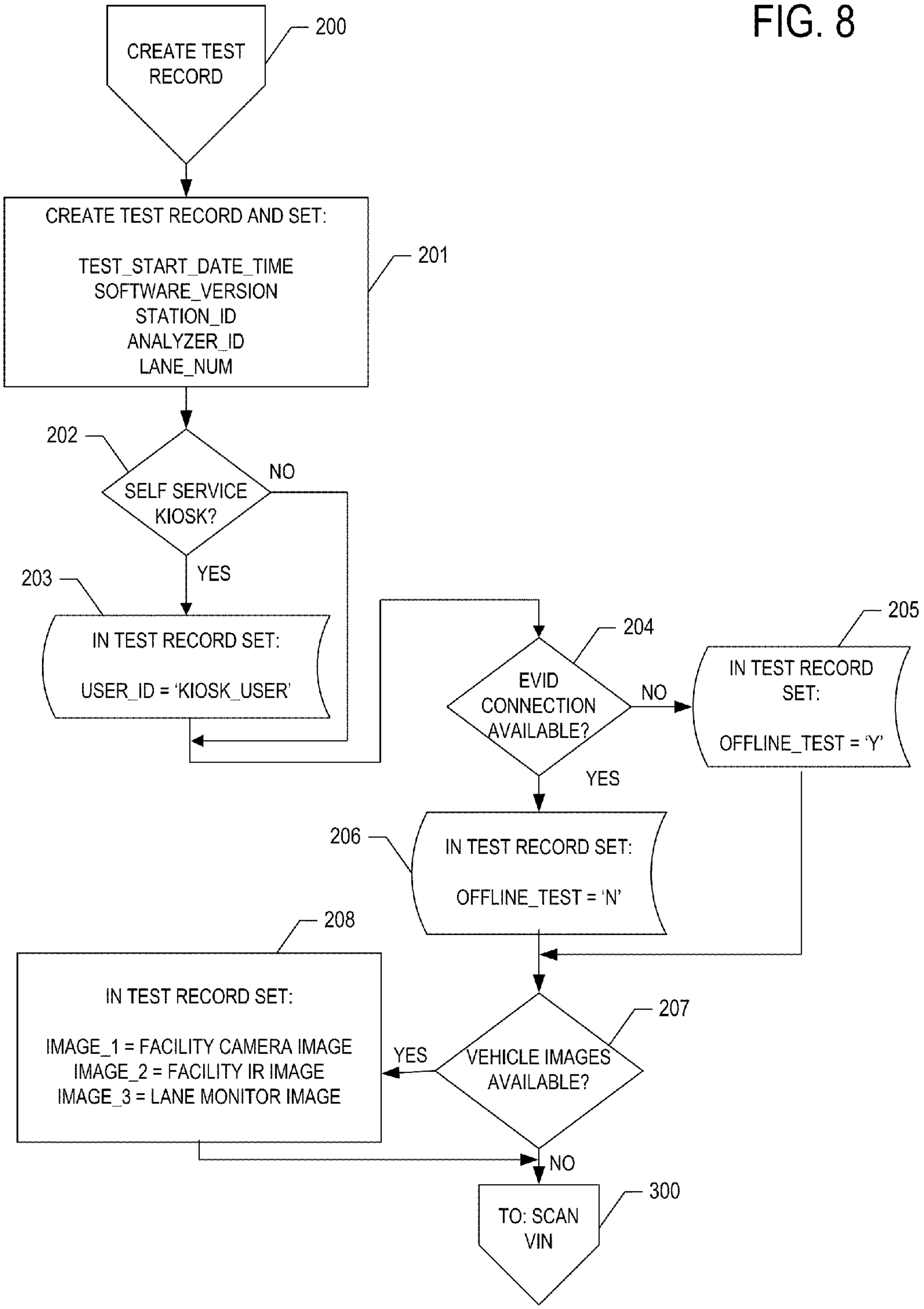
FIG. 8 is a flow chart illustrating a test record creation procedure for the self-service kiosk system.

Referring to FIG. 8, the CREATE TEST RECORD procedure at block 200 creates a test record for storing data in the storage device 37. At block 201, the system 10 creates a Test Record in the storage device 37 having the test date and time; software version being utilized by the system 10; the identification number of the self-service kiosk 12 being utilized; the identification of the analyzer being utilized; and lane number. At decision point 202, if the self-service kiosk 12 is not in self-service mode, then at decision point 204 the system determines whether communication has been established with the vehicle information database 14. However, if at decision point 202 the self-service kiosk 12 is in self-service mode, then at block 203 the user identification is stored in the storage device 37 and system 10 proceeds to decision point 204.

At decision point 204, if no communication has been established with the vehicle information database 14 the Test Record has stored that an offline test has been performed at block 205, while if communication has been established with the vehicle information database the Test Record has stored that no offline test has been performed at block 206. System 10 then proceeds to decision point 207 to determine whether one or more cameras 21 are available for taking images of the vehicle and/or test site and whether one or more predetermined conditions have been met to make the taking and storage of such images appropriate. If so, in one embodiment, the cameras 21 will begin taking video images from a facility camera, infrared camera and lane monitor camera. The system 10 then proceeds to the VIN SCANNING procedure at block 300.

Figure 9:
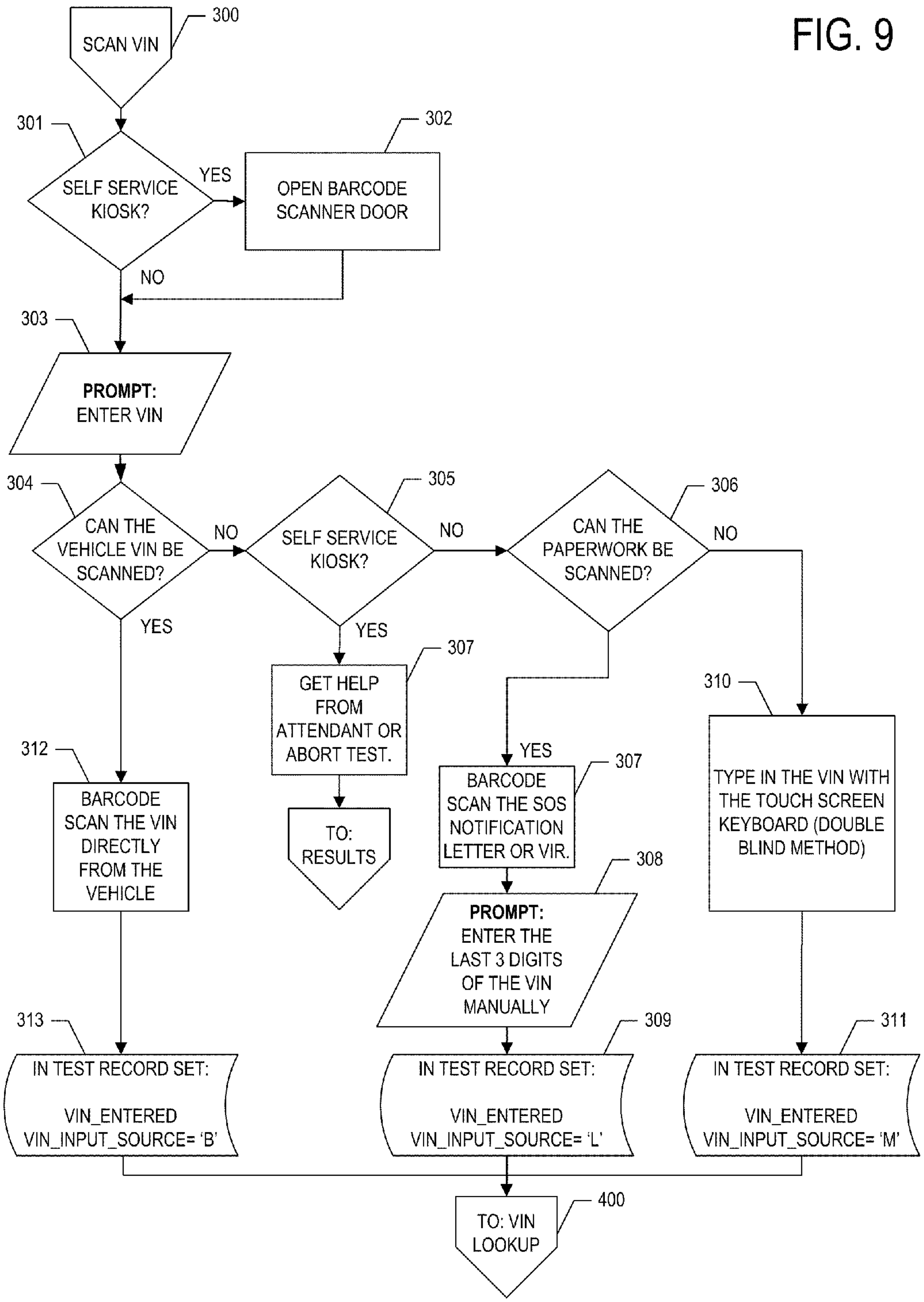
FIG. 9 is a flow chart illustrating one embodiment of a vehicle information number scanning procedure for the self-service kiosk system.

Referring to FIG. 9, at block 300 the system proceeds to decision point 301 to determine whether the self-service kiosk 12 is in a self-service mode or a non self-service mode. If the self-service kiosk 12 is in the self-service mode, at block 302 the security door 45 is opened for the user to gain access to the barcode scanner 33. If not in the self-service mode, system 10 proceeds directly to block 303 where the monitor 24 displays a prompt to enter the vehicle information (VIN) of the vehicle being tested. At decision point 304, the system 10 determines whether the VIN of the vehicle can be scanned. For example, the VIN is not scannable, accessible or locatable by the user. If the VIN cannot be scanned, then at decision point 305 the system 10 determines if the self-service kiosk 12 is in self-service mode. If so, the monitor 24 prompts the user to get help from an attendant at block 307. If not, then at decision point 306 the system 10 determines whether the vehicle's paperwork be scanned by the barcode scanner 33, If the paperwork can be scanned, then the user at block 307 scans in the SOS Notification or VIR and then the monitor 24 prompts the user to enter the last 3 digits of the VIN manually into the self-service kiosk 12 in which the Test Record stores the VIN information and then proceeds to block 400 for looking up VIN information. At decision point 306, if the paperwork cannot be scanned then at block 310 the user types in the VIN information of the vehicle using the touch screen capability of the monitor 24. In one embodiment, the manual entry of the VIN information may be made in a double blind manner such that the number must be entered twice with the numbers of the first screen being blocked out. At block 311, the Test Record stores the VIN information entered by the user and the system proceeds to block 400.

However, if at decision block 304 the barcode scanner 33 can directly scan the VIN from the vehicle, then at block 312 the user scans in the VIN information directly from the vehicle using the barcode scanner. At block 313, the Test Record stores the VIN information and the system 10 proceeds to block 400.

Figure 10:
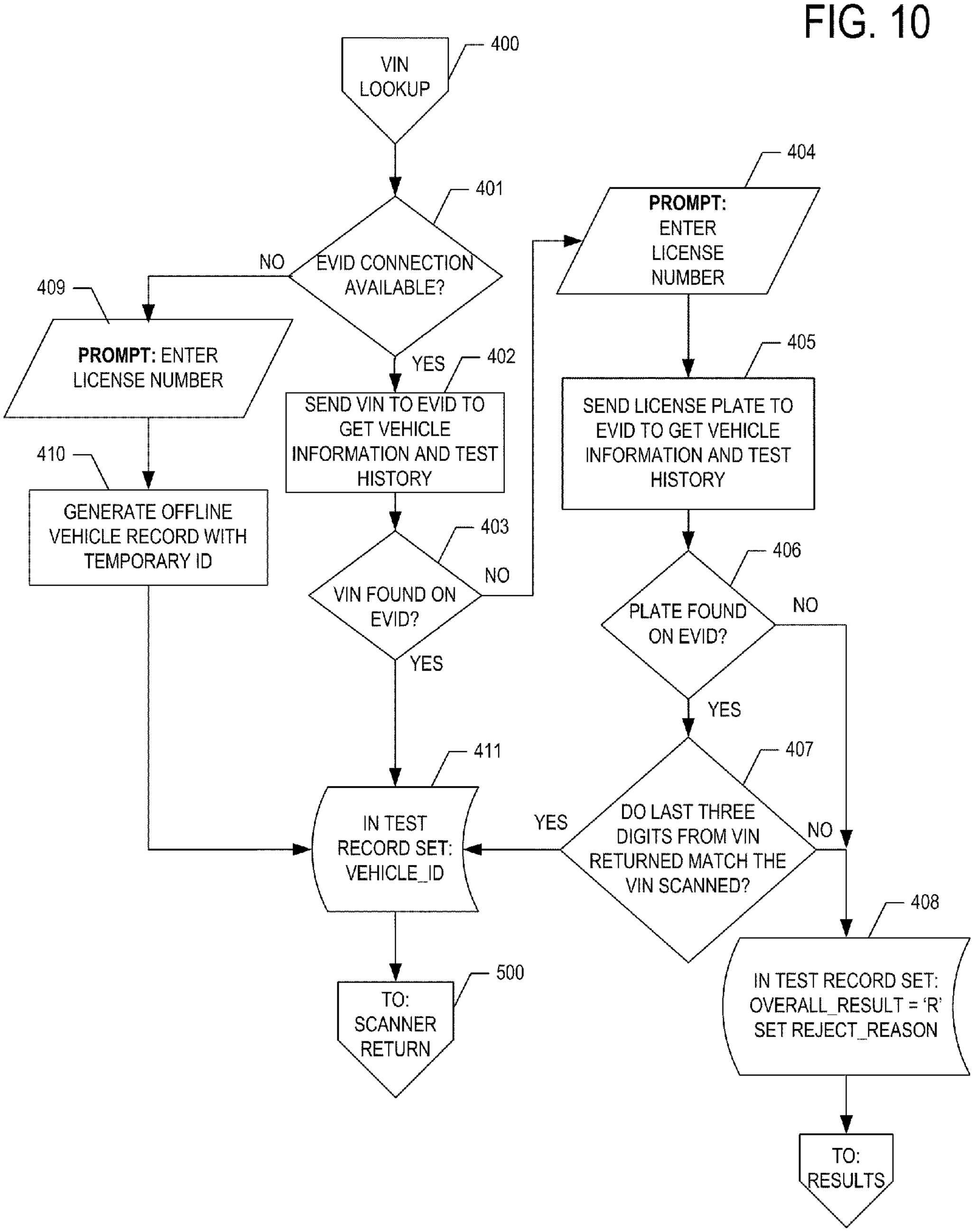
FIG. 10 is a flow chart illustrating one embodiment of a vehicle information number look-up procedure for the self-service kiosk system.
Figure 11:
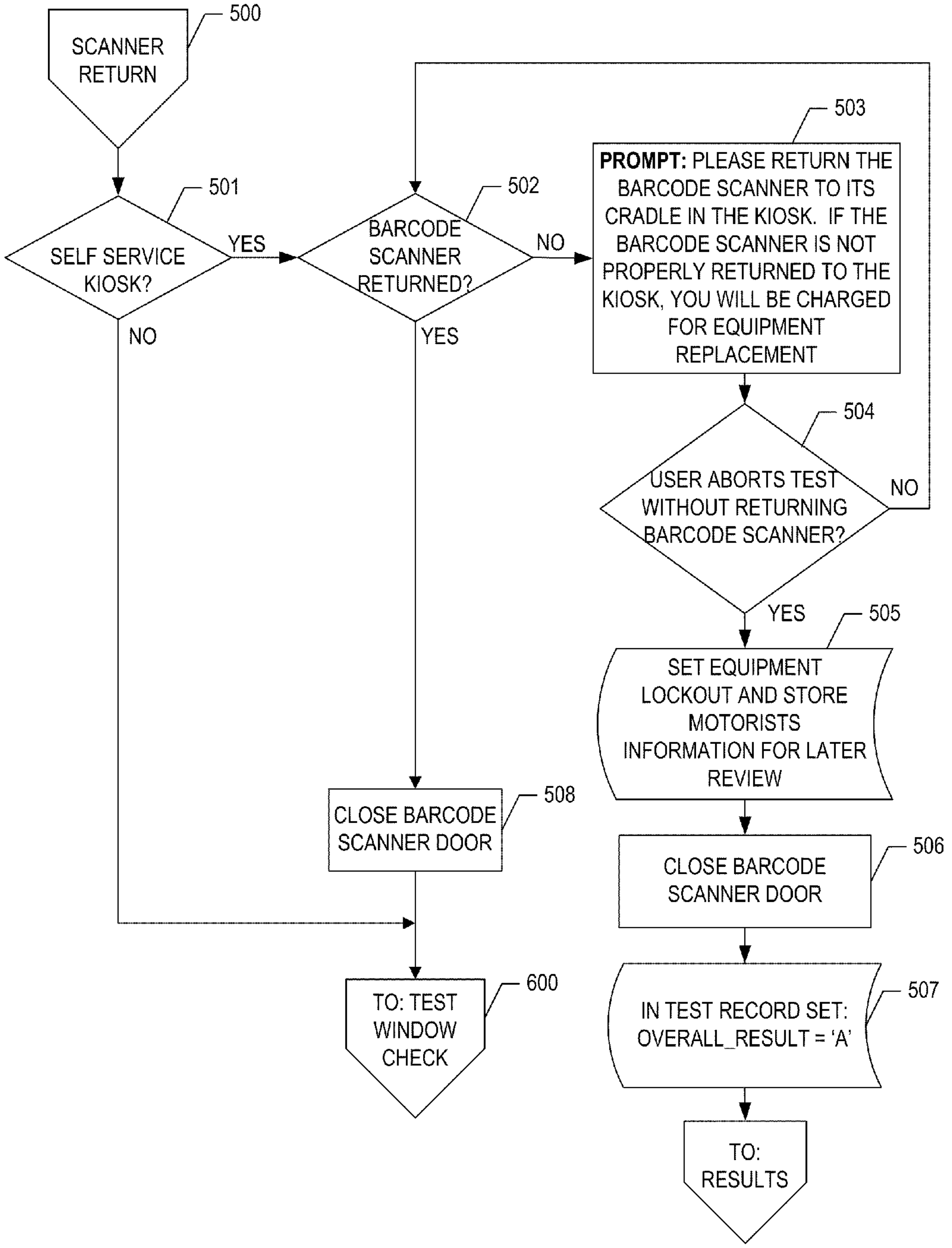
FIG. 11 is a flow chart illustrating one embodiment of a barcode scanner operation procedure for the self-service kiosk system.

Referring to FIG. 10, the VIN LOOKUP procedure is initiated at block 400. At decision point 401 the system 10 determines whether communication has been established with the vehicle information database 14. If not, the monitor 24 will display a prompt for the user to enter the license plate number of the vehicle at block 409 and then at block 410 generate an offline vehicle record with a temporary identification that is stored in the Test Record at block 411. If communication has been established with the vehicle information database 14 at decision point 401, then at block 402 the system 10 transmits the VIN information to the vehicle information database 14 and then proceeds to decision point 403 to determine whether the VIN information of the vehicle being tested been found in the vehicle information database 14. If the VIN was found then the Test Record stores the vehicle identification of the vehicle being tested at block 411, while if the VIN is not found then the monitor 24 prompts the user to enter the license plate number of the vehicle at block 404. At block 405, the user sends the license plate number to the vehicle information database 14 in order to obtain the vehicle information and test history. At decision point 406, the system 10 determines whether the license plate number was found in the vehicle information database 14. If no license plate was found, then the Test Record stores that the result of the vehicle emissions is that the vehicle has been rejected and the reasons for the rejection. If at decision point 406 the license plate number is found in the vehicle information database 14, then the system 10 determines at decision point 407 whether the last three digits from the VIN returned from the vehicle information database 14 match the VIN scanned by the barcode scanner 33. If there is no match, then the system 10 proceeds to block 408 to record in the Test Record the rejection status of the vehicle emissions test. However, if there is a match, then the vehicle information is stored in the Test Record at block 411 and system 10 proceeds to block 500 to perform the SCANNER RETURN procedure.

Referring to block 500, the SCANNER RETURN procedure is illustrated. At decision point 501, if the self-service kiosk 12 is not in the self-service mode then the system 10 proceeds to block 600 to perform the TEST WINDOW CHECK procedure. However, if the self-service kiosk 12 is in the self-service mode then at decision point 502 the system 10 determines whether the barcode scanner has been returned to the self-service kiosk 12. If the barcode scanner 33 has not been returned, then the monitor 24 prompts the user to return the barcode scanner 33 at block 503. At decision point 504, the system 10 determines whether the user has aborted the test without returning the barcode scanner to the self-service kiosk 12. If the user has not aborted the test, the system 10 returns to decision point 502 to determine whether the barcode scanner 33 has been returned. If at decision point 504, that the user did abort the test without returning the barcode scanner then at block 505 the system 10 locks out the self-service kiosk 12 and stores the user's information to the storage device 37 for later review. At block 506, the system 10 then closes the security door 45 to the barcode scanner 33 and at block 507 the Test Record stores the result that the barcode scanner was not returned to the self-service kiosk 12. At decision point 502, if the barcode scanner 33 is returned, then at block 508 the security door 45 is closed and the system 10 proceeds to TEST WINDOW CHECK procedure at block 600.

Figure 12:
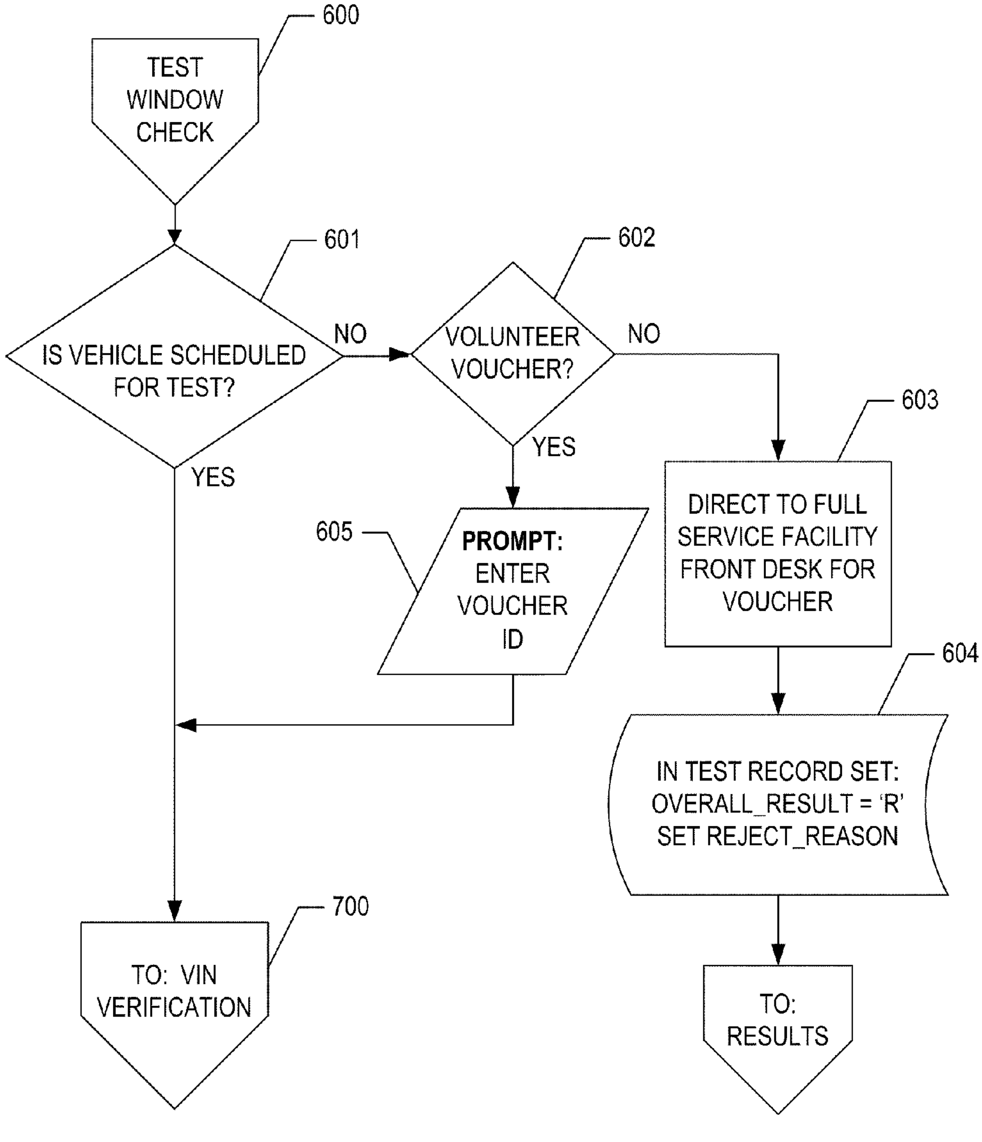
FIG. 12 is a flow chart illustrating one embodiment of a test window check procedure for the self-service kiosk system.

Referring to FIG. 12, the TEST WINDOW CHECK procedure is illustrated. At decision point 601, the system 10 determines whether the vehicle is scheduled for testing. If the vehicle is scheduled for testing, then the system 10 proceeds to VIN VERIFICATION procedure at block 700. However, if the vehicle is not scheduled for testing, then at decision point 602 the system 10 determines whether Vehicle Record includes data that the volunteer voucher is authorized. If the volunteer voucher is authorized, then the monitor 24 prompts the user to enter the Voucher Identification and then the system 10 proceeds to VIN VERIFICATION procedure at block 700. If the volunteer voucher is not authorized, then at block 603 the user is directed to the front desk of a full service testing facility for obtaining a voucher for the self-service kiosk 12. At block 604, the Test Record stores that the vehicle was rejected and the results stored in the storage device 37.

Figure 13:
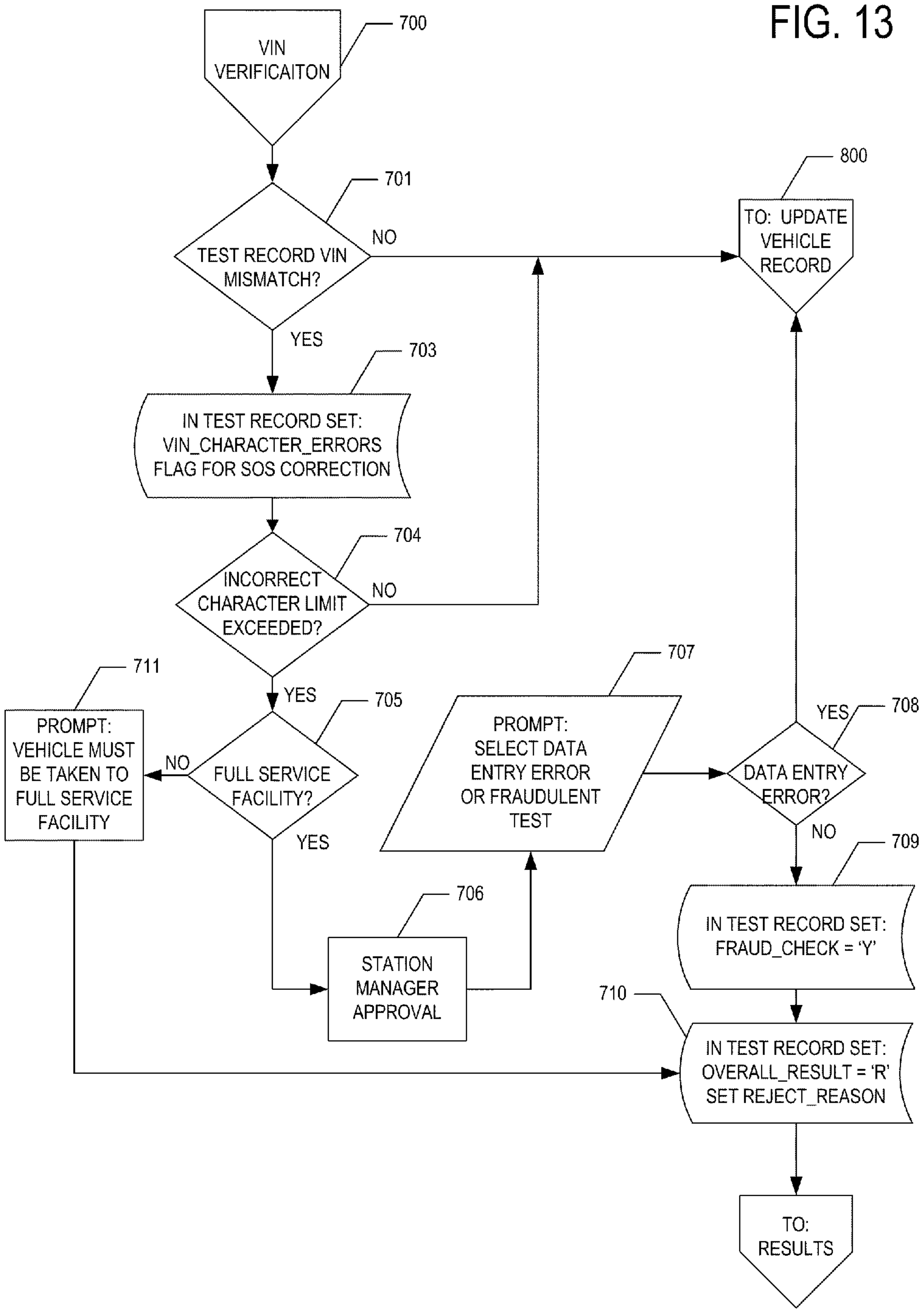
FIG. 13 is a flow chart illustrating one embodiment of a vehicle information verification procedure for the self-service kiosk system.

As shown in FIG. 13, the VIN VERIFICATION procedure is illustrated. At decision point 701, the system 10 determines whether the information in the Test Record does not match with the VIN of the vehicle. If there is no mismatch, then the system 10 proceeds directly to block 800 to perform the UPDATE VEHICLE RECORD procedure. However, if there is a mismatch, then at block 703 the Test Record stores a VIN character errors flag for future correction. At decision point 704, the system 10 determines whether the scanned VIN has more characters than the predetermined limit set in the storage device 37. If not, then the system proceeds directly to block 800 to update the Vehicle Record. If so, then at decision point 705, the system 10 determines whether the self-service kiosk 12 is in a full service facility. If not, the monitor 24 prompts the user to take the vehicle to a full service facility for vehicle testing. If the self-service kiosk 12 is part of a full service facility the system 10 prompts the station manager at block 706 for approval wherein at block 707 the station manager is prompted on monitor 24 to select either that the data was incorrectly entered or a fraudulent test has occurred. At decision point 708, if a data entry error occurred, then the system 10 proceeds to block 800; however, if the there was no data entry error, then at block 709 a fraud flag is set in the storage device 37 and then at block 710 the Test Record stores that the vehicle was rejected and the basis for the rejection.

Figure 14A:
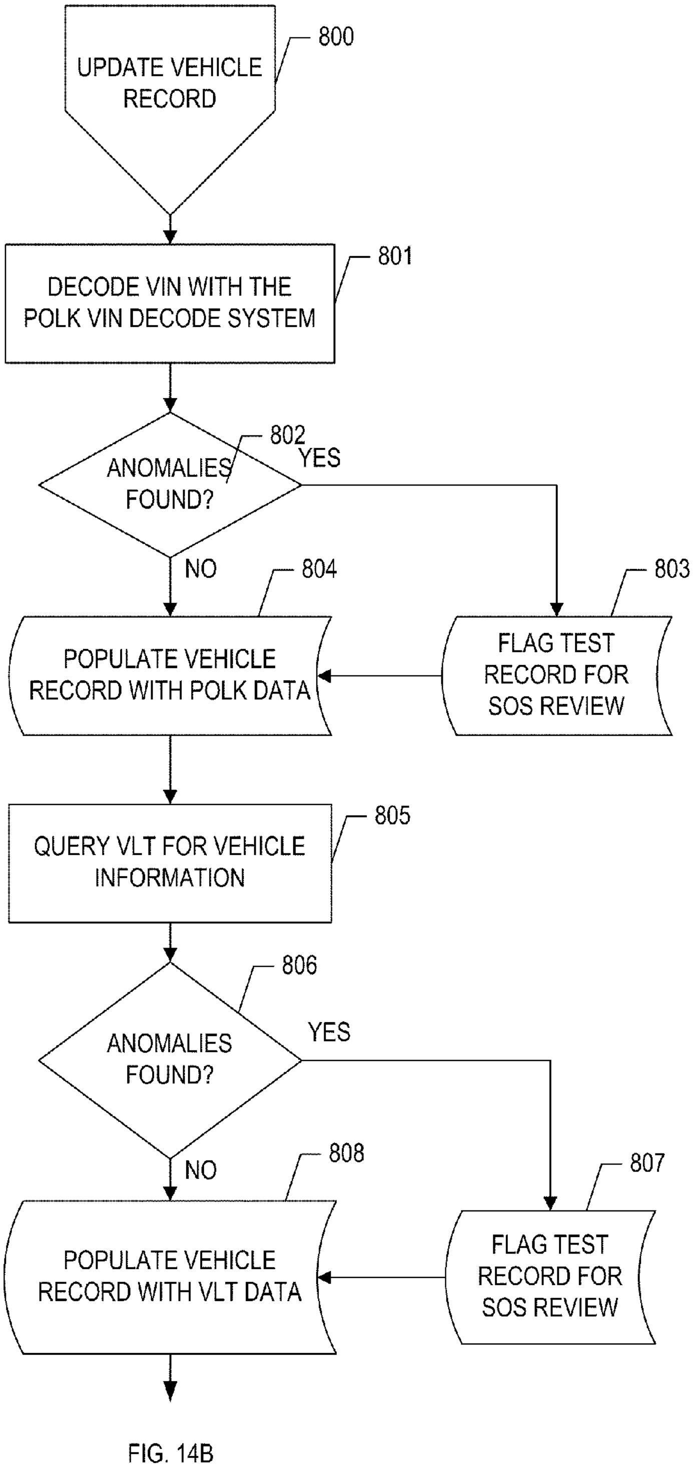
FIG. 14A is a flow chart illustrating one embodiment of a vehicle record update procedure for the self-service kiosk system.
Figure 14B:
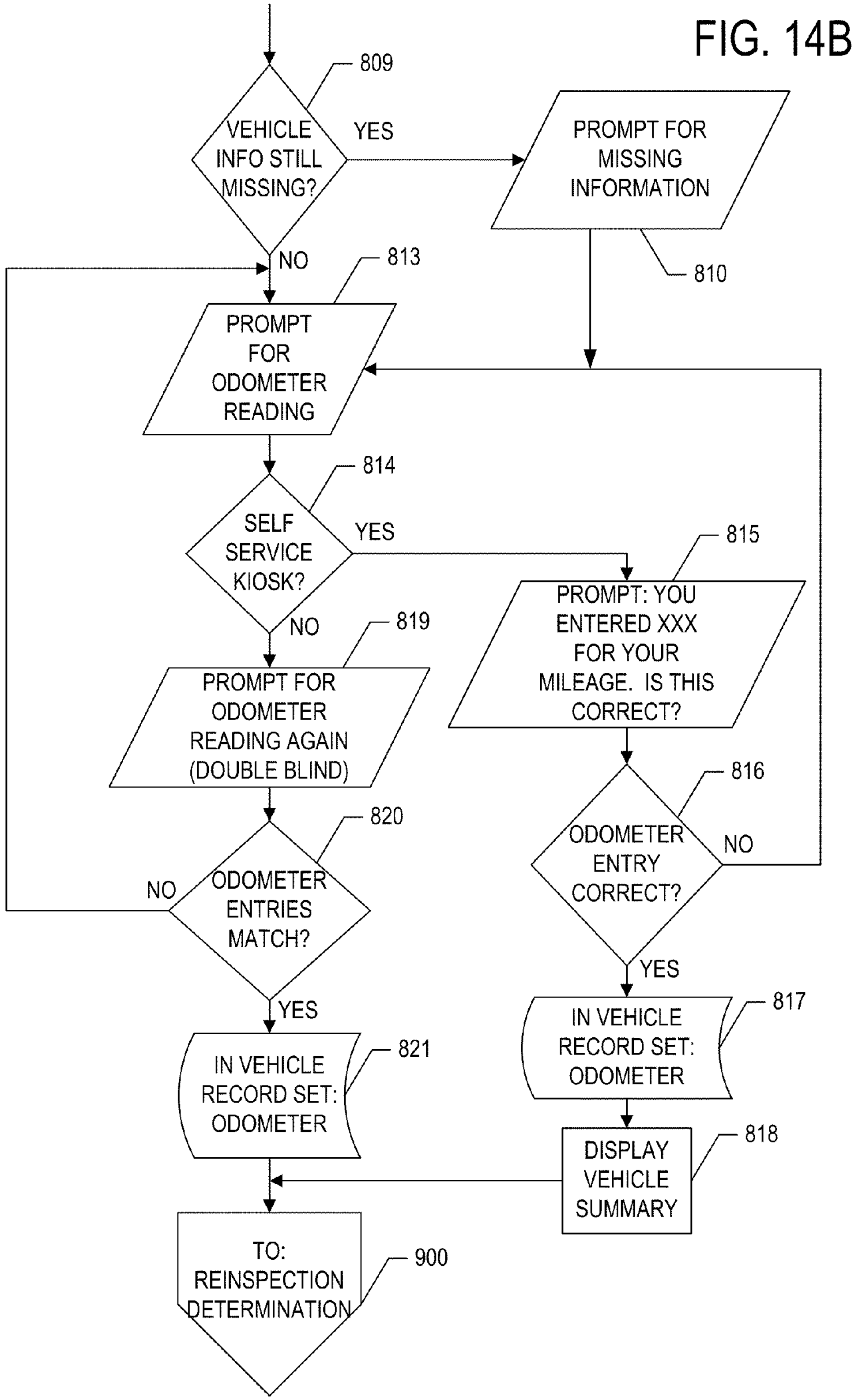
FIG. 14B is a flow chart illustrating the embodiment of the vehicle record update procedure for the self-service kiosk system.

Referring to FIGS. 14A and 14B, the UPDATE VEHICLE RECORD procedure is illustrated. At block 801, the system 10 decodes the VIN of the vehicle with a POLK VIN Decode subsystem which is a set of data that allows for retrieval of vehicle details, such as cylinder types, based on the VIN of the vehicle. At decision point 802, the system 10 determines whether any anomalies are present. Anomalies may appear if there is a temporary loss of network connection, or if there is a mismatch between the retrieved Vehicle Record and the existing Vehicle Record. If anomalies are present, the Test Record stores a flag for later review and then proceeds to block 804 to have the system 10 populate the Vehicle Record with the data from the POLK VIN Decode subsystem. The system 10 continues to block 805 to query a Vehicle Lookup Table (VLT) for another set of data containing vehicle information, such as makes/models/years/cylinders, etc. At decision point 806, if any anomalies are present, then the Test Record stores a flag for later review at block 807, while if no anomalies are present, then at block 808, the Vehicle Record is populated with VLT data. At decision point 809, the system 10 determines if any vehicle information is missing. If vehicle information is missing, then the monitor 24 displays a prompt to the user that vehicle information is missing and the system 10 proceeds to block 813; however, if no vehicle information is missing then the system 10 proceeds directly to block 813 where the user is prompted by monitor 24 to enter the current odometer reading.

At decision point 814, the system 10 determines whether the self-service kiosk 12 is in the self-service mode. If so, then at block 815 the monitor 24 displays a prompt for the user to verify the odometer entry. At decision point 816, if the odometer entry is correct, then at block 817, the Vehicle Record stores the odometer entry and then proceeds to block 818 to display the Vehicle Summary on the monitor 24. After displaying the vehicle summary, the system 10 proceeds to block 900 to perform a REINSPECTION DETERMINATION procedure. However if at decision point 814, the self-service kiosk 12 is not in self-service mode, then at block 819 the monitor 24 prompts the user to enter the odometer again into the self-service kiosk 12 using the double blind manner described above. At decision point 820, the system 10 determines if the odometer entries match. If the odometer entries do not match then the system 10 returns to block 813 to prompt the user for the odometer reading. However, if the odometer entries do match then at block 821 the Vehicle Record stores the entered odometer reading and the system then proceeds to block 900.

Figure 15:
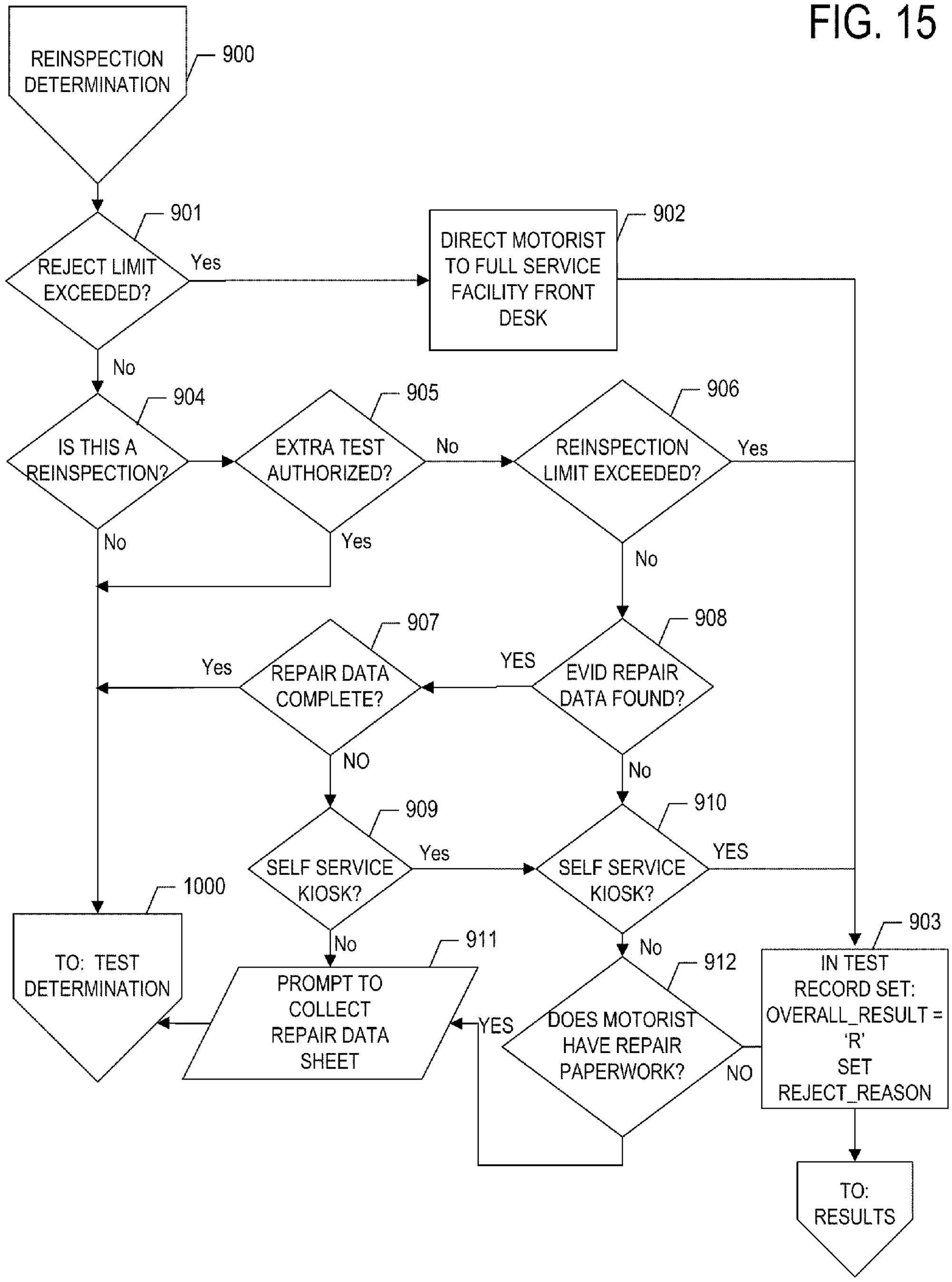
FIG. 15 is a flow chart illustrating one embodiment of a re-inspection determination procedure for the self-service kiosk system.

Referring to FIG. 15, the REINSPECTION DETERMINATION procedure is illustrated. At decision point 901, the system 10 determines whether the vehicle being tested has been rejected a predetermined number of times. If so, then the monitor 24 displays a message at block 902 that directs the user to a front desk of a full service facility and the Test Record stores a rejection as the result of the vehicle emissions test at block 903. However, if the system 10 determines that the vehicle has not been rejected a predetermined number of times, at decision point 904 the system determines whether the vehicle being tested is undergoing a reinspection. If a resinspection is being conducted, then at decision point 905 the system 10 determines whether the reinspection has been authorized. If the reinspection is authorized, the system 10 proceeds to block 1000 to run the TEST DETERMINATION procedure. If the resinspection is not authorized, at decision point 906 the system 10 determines whether a predetermined number of reinspections have been exceeded. If so, then at block 903 the Test Record stores the rejection result for the vehicle being tested. If the predetermined number of reinspections has not been exceeded, then at decision point 908, the system 10 determines whether the repair data for the vehicle being tested was found on the vehicle information database 14. If the repair data was found then at decision point 907 the system 10 determines whether the repair data is complete. If the repair data is complete, then system 10 proceeds to block 1000. However, if at decision point 907 the repair data is not complete, then at decision point 909 the system 10 determines whether the self-service kiosk 12 is in self-service mode. If the self-service kiosk 12 is in the self-service mode then the system proceeds to block 903 so that the Test Record stores the rejection result of the vehicle being tested. However, if at decision point 909 the self-service kiosk 12 is in the non self-service mode then the monitor 24 displays a prompt for the attendant to collect the repair data sheet for the user at block 911. After collection of the repair data sheet the system 10 proceeds to the TEST DETERMINATION procedure at block 1000.

At decision block 908, if the repair data is not found in the vehicle information database 14, then at decision point 910 the system 10 determines whether the self-service kiosk 12 is in the self-service mode. If so, then the system 10 proceeds to block 903 for the Test Record to store a rejection result for the vehicle being tested. However, if the self-service kiosk 12 is not in the self-service mode, then at decision point 912 the system 10 determines whether the user has the necessary repair paperwork. If not, then the Test Record at block 903 stores a rejection result for the vehicle being tested, while if the user has the necessary repair paperwork, the attendant at block 911 is prompted by the monitor 24 to collect the repair data sheet and the system 10 proceeds to block 1000 for initiating the TEST DETERMINATION procedure.

Figure 16:
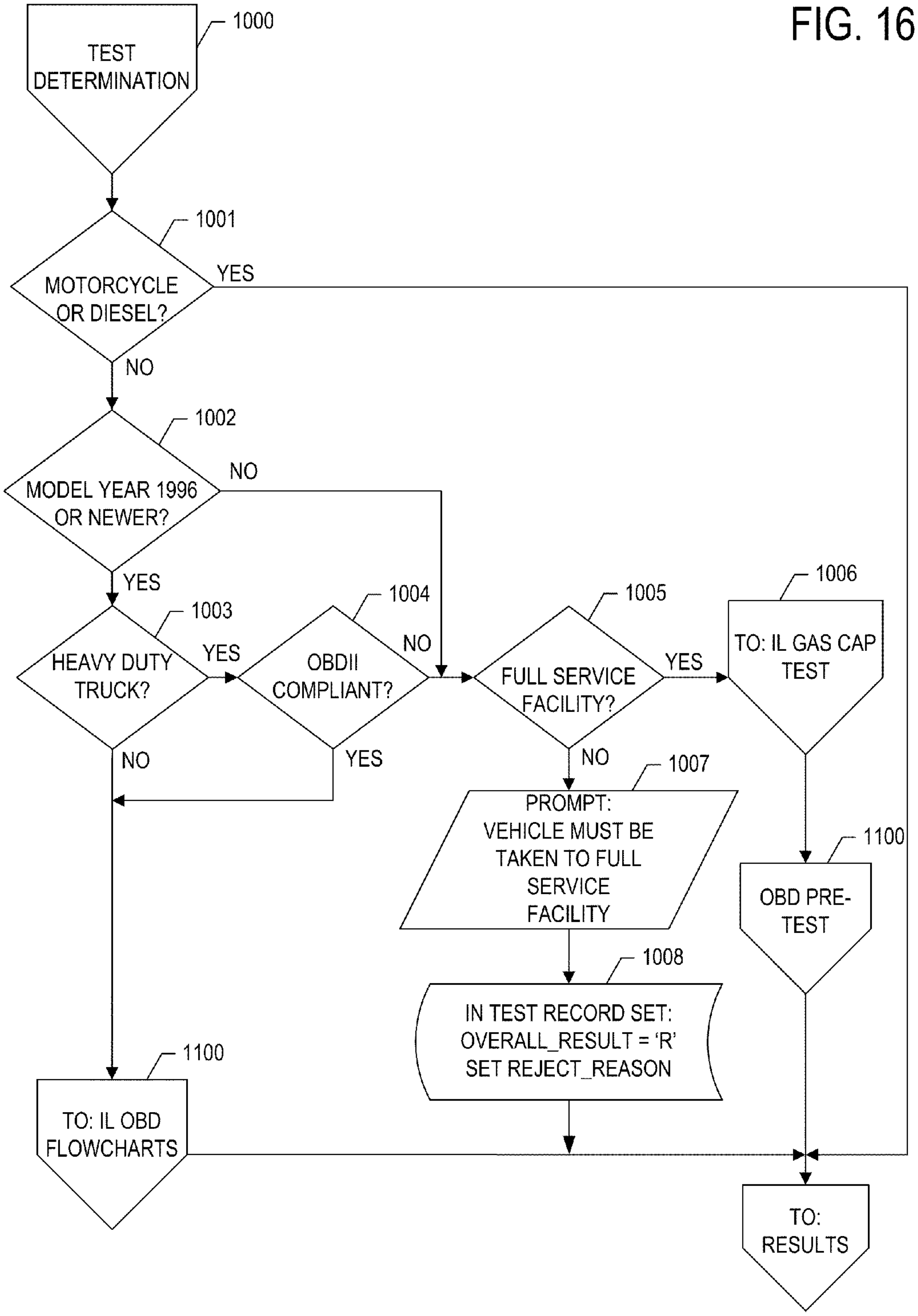
FIG. 16 is a flow chart illustrating one embodiment of a test determination procedure for the self-service kiosk system.

Referring to FIG. 16, the TEST DETERMINATION procedure is illustrated. At decision block 1001, the system 10 determines whether the vehicle being tested is a motorcycle or a vehicle having a diesel engine? If so, system 10 proceeds to recording that the vehicle being tested has been rejected since the self-service kiosk 12 is incapable of testing either motorcycles or vehicles having diesel engines. However, if the vehicle being tested is not a motorcycle or a vehicle having a diesel engine, then at decision point 1002, the system 10 determines whether the vehicle being tested is a model year 1996 or later since vehicles that predate 1996 model years lack an OBD-II in the vehicle to be tested. If the model year of the vehicle being tested predates the 1996 model year then at decision point 1005 the system 10 determines whether the self-service kiosk 12 is associated with a full service facility capable of performing vehicle emissions testing on vehicles that lack an OBD-II. However, at decision point 1002 if the vehicle being tested is a model year 1996 or later then at decision point 1003 the system 10 determines whether the vehicle being tested is a heavy duty truck since not all heavy duty vehicles are OBD-II compliant. If the vehicle being tested is not a heavy-duty truck then system 10 proceeds to block 1100 to conduct OBD testing of the vehicle. However, if the vehicle being tested is a heavy-duty truck then at decision point 1004 the system 10 determines whether the truck being tested is OBD-II compliant. If the truck is OBD-II compliant then the system 10 proceeds directly to block 1100 to conduct OBD testing of the truck. At decision point 1004, if the truck is not OBD-II compliant then the system 10 proceeds to decision block 1005 to determine if a full service facility is available.

At decision block 1005, if a full service facility is not available then at block 1007 the monitor 24 displays a prompt to the user to take the vehicle being tested to a full service facility and then the Test Record stores the rejection result for the vehicle being tested. However, if a full service facility is available then at block 1006 a gas cap test or other non-OBD-II testing may be performed. The system 10 then proceeds to block 1100 to perform the OBD PRE-TEST procedure.

Figure 17:
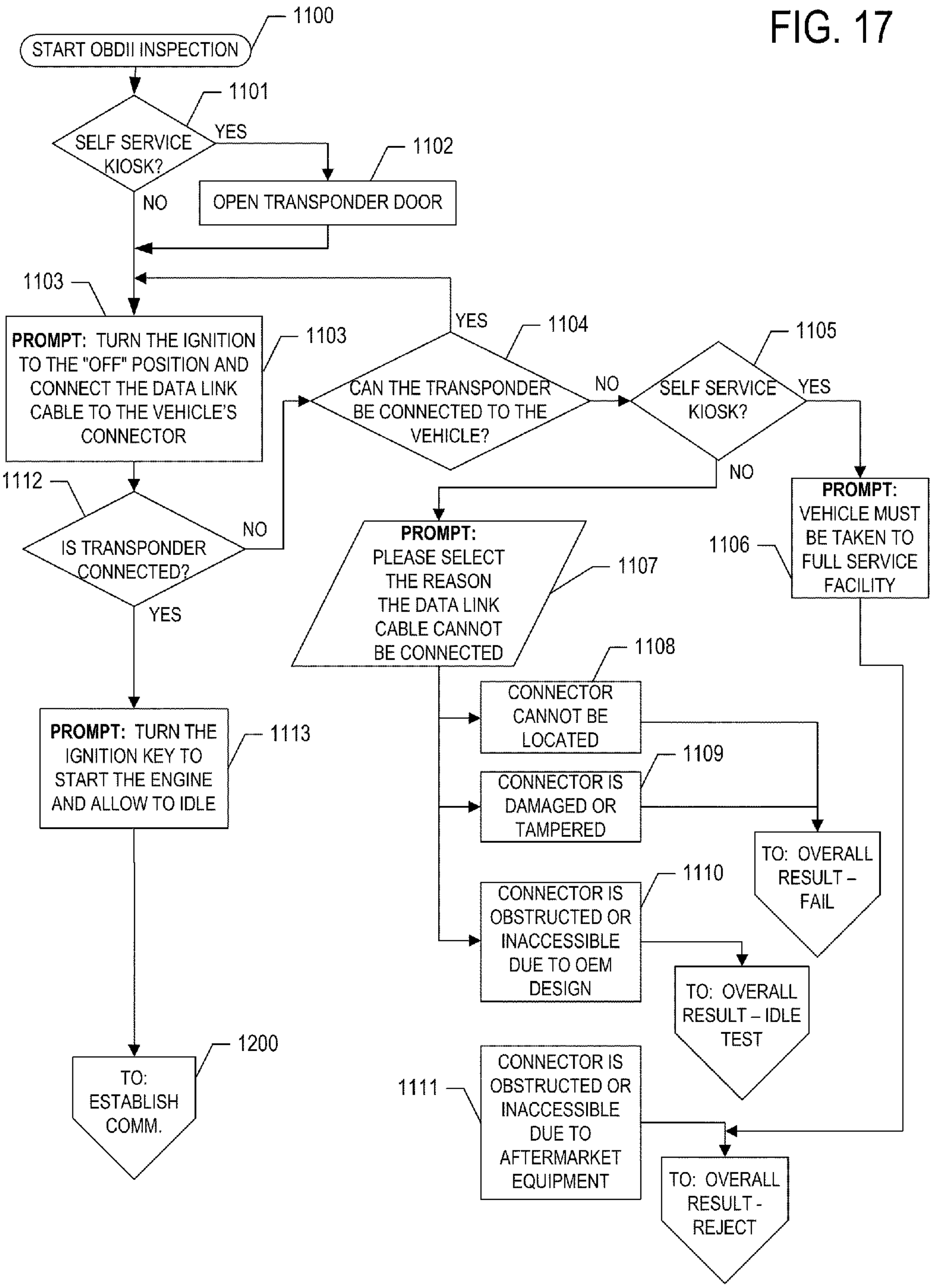
FIG. 17 is a flow chart illustrating one embodiment of an OBD pre-test procedure for the self-service kiosk system.

Referring to FIG. 17, the OBD PRE-TEST procedure is illustrated. At block 1100 the OBD-II inspection is initiated which then proceeds to decision point 1101 to determine whether the self-service kiosk 12 is in the self-service mode. If so, then at block 1102 the processor instructs that the security door 30 that protects the OBD interface 28 be opened to allow access to the OBD reader 46 (FIG. 4). If the self-service kiosk 12 is not in the self-service mode then the monitor 24 displays a prompt at block 1103 for the user to turn the ignition of the vehicle being tested to the OFF position and connect the OBD reader 46 to the vehicle's OBD connection site (not shown). Once the OBD reader 46 has been connected, then at decision point 1112, the system 10 determines whether the OBD reader 46 has actually been connected. If the OBD reader 46 is connected, then at block 1113 the monitor 24 displays a prompt to turn the ignition key to start the engine and permit the engine to idle. Once the engine has been turned on then the system proceeds to block 1200 to perform the OBD CONNECTON procedure. If at decision point 1112 the OBD reader 46 is not connected then at decision point 1104, the system 10 determines whether the OBD reader 46 can be connected to the vehicle. If so, the system 10 returns to block 1103 to prompt the user to connect the OBD reader 46; however, if the OBD reader 46 cannot be connected then at decision point 1105 the system 10 determines whether the self-service kiosk 12 is in the self-service mode. If the self-service kiosk is in the self-service mode, then the monitor 24 displays a prompt at block 1106 that the vehicle must be taken to a full service facility to perform the vehicle emissions test. However, if the self-service kiosk 12 is not in the self-service mode then the monitor 24 displays a prompt that the user selects the reason why the OBD reader 46 is not connected to the vehicle being tested. At block 1108, the user can select that the OBD connection site for the vehicle cannot be located and then the Test Record stores the rejection status of the vehicle. At block 1109, the user can select that the OBD connection site for the vehicle is either damaged or been tampered and then the Test Record stores the rejection status of the vehicle. At block 1110, the user can select that the OBD connection site is obstructed or inaccessible due to OEM design and then the Test Record stores the rejection status of the vehicle. Finally, at block 1111 the user can select that the OBD connection site is obstructed or inaccessible due to aftermarket equipment being installed into the vehicle and then the Test Record stores the rejection status of the vehicle.

Figure 18:
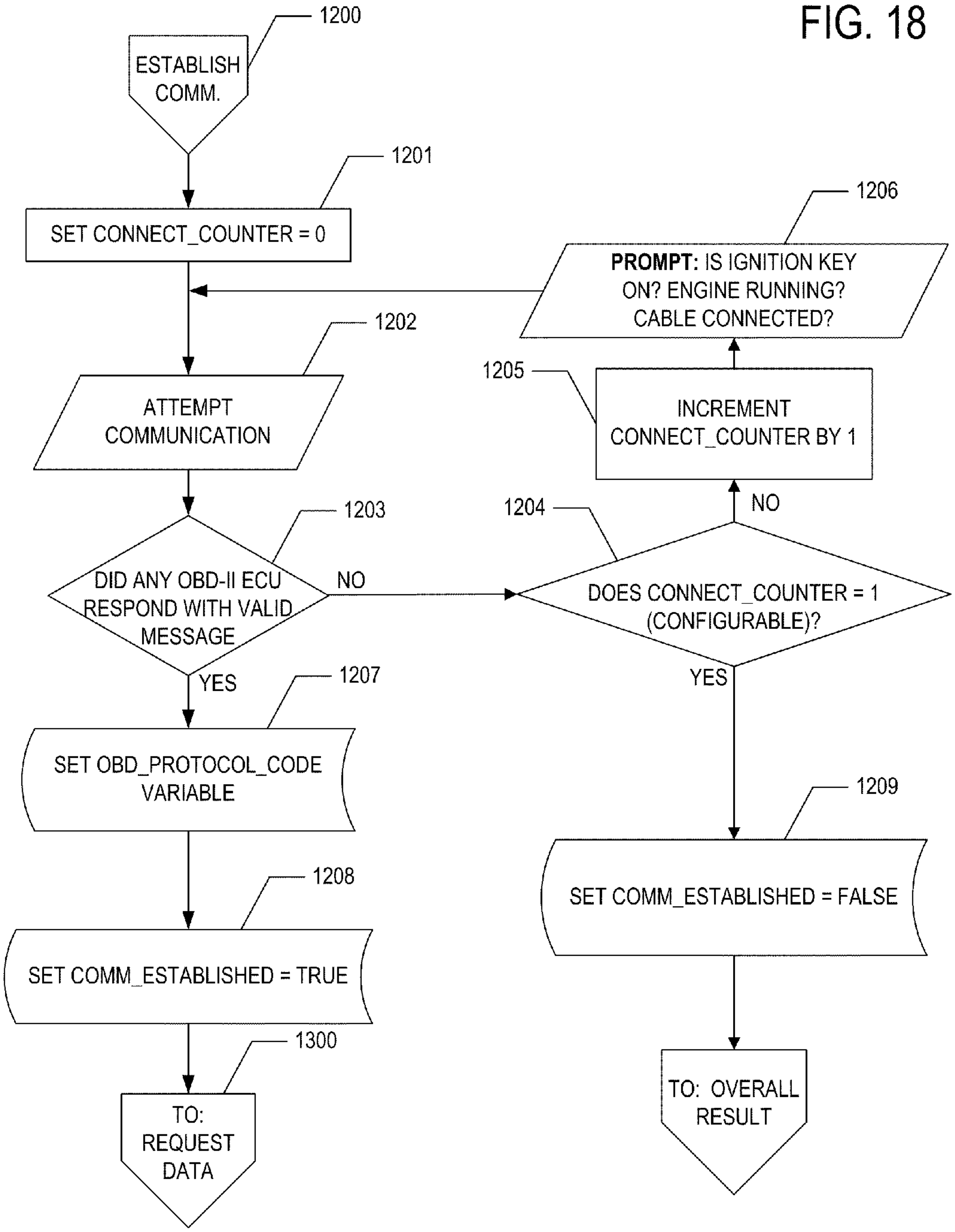
FIG. 18 is a flow chart illustrating one embodiment of an OBD communication procedure for the self-service kiosk system.

Referring to FIG. 18, the OBD CONNECTION procedure is illustrated. At block 1200 the OBD CONNECTON procedure is initiated. At block 1201, the system 10 sets a counter to the number of times the OBD reader 46 is attempted to be connected to the vehicle being tested. At block 1202, the monitor 24 displays a prompt for the user to connect the OBD reader 46 to the OBD connection site of the vehicle being tested such that communication is established between the engine control unit (ECU) of the OBD-II and the processor 35 of the self-service kiosk 12. The ECU forms a part of the OBD-II of the vehicle being tested and collects information related to a particular aspect of the vehicle, such as engine operational efficiency, engine speed, etc. Once connected, at decision point 1203, the system 10 determines whether the ECU for the vehicle confirms that communication has been established with the self-service kiosk 12. If the ECU does not confirm such communication, then at decision point 1204, the system 10 determines whether a counter equals a value of one. In one embodiment, the counter is initially set at zero. If the counter is not equal to a value of one then at block 1205 the system 10 incrementally advances the counter value by one. At block 1206, the monitor 24 displays number of inquires by prompting the user whether the ignition key is on, if the engine is running, and whether the OBD reader 46 is engaged to the vehicle being tested. Once the inquiries have been displayed to the user the system 10 returns to block 1202. However, at decision point 1204, if the counter value does equal one then at block 1209, the system 10 writes in the storage device 37 that communication with the OBD-II has failed.

At decision point 1203, if the ECU confirms that communication has been established with the self-service kiosk 12 then at block 1208 the system 10 writes in the storage device 37 that communication with the OBD-II has been established. After such confirmation has been stored in the storage device 37, the system 10 continues to block 1300 to perform the REQUEST DATA procedure.

Figure 19:
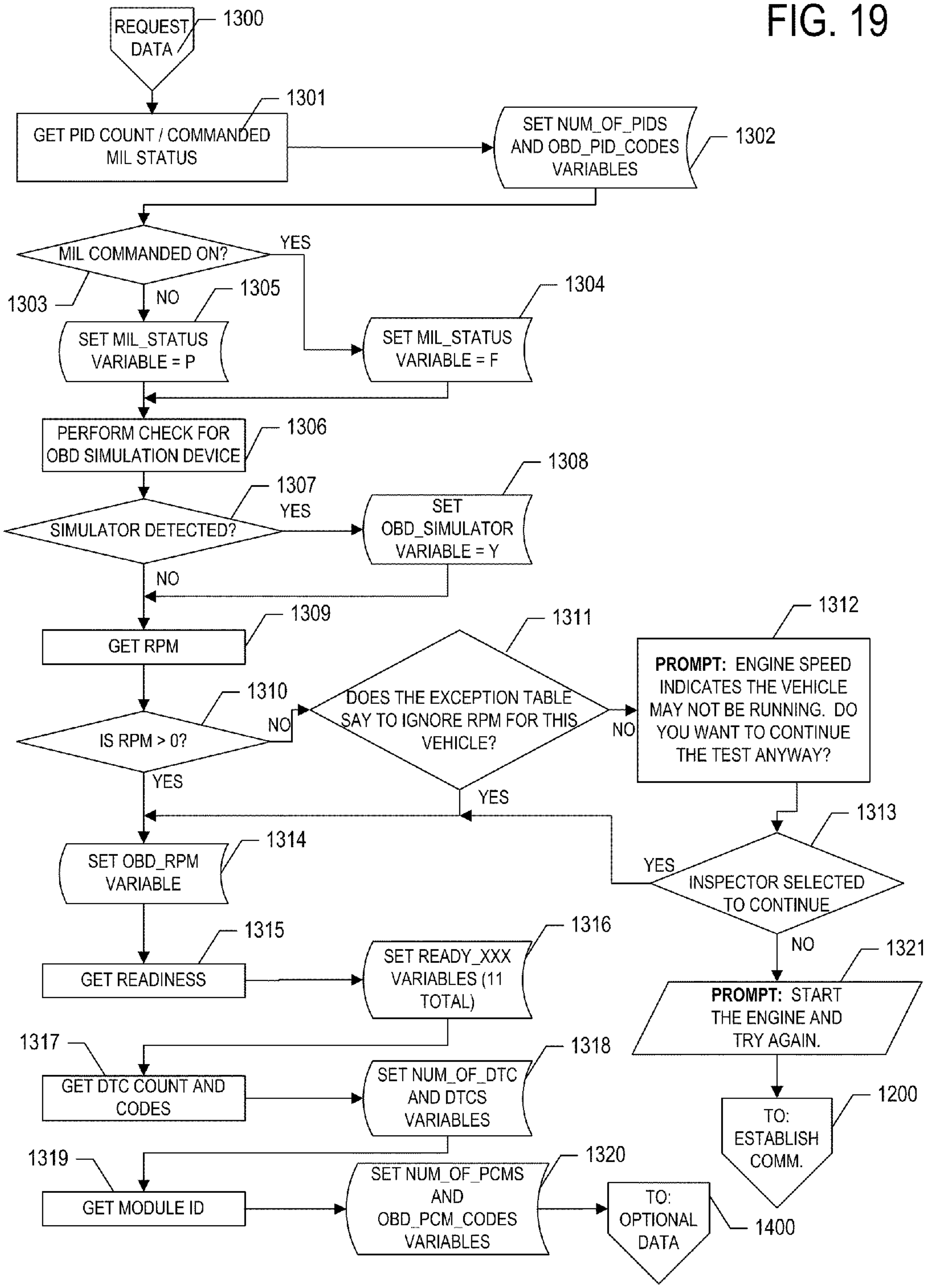
FIG. 19 is a flow chart illustrating one embodiment of a data request procedure for the self-service kiosk system.

Referring to FIG. 19, the REQUEST DATA procedure is illustrated. At block 1033, the REQUEST DATA procedure is initiated such that at block 1301 the system 10 counts the number of Parameter Identification Counts (PID) contained in the ECU of the OBD-II for the vehicle being tested. The ECU may record a particular PID for various factors, such as vehicle speed, RPM, etc, related to vehicle performance and/or operation. At block 1302, the system 10 stores the number of PIDs retrieved from the ECU and the PID codes related to each PID that was retrieved. At decision point 1303, the system 10 determines whether the Malfunction Indicator Lamp (MIL) has been activated, such as when the ECU detects that the CHECK ENGINE light is on due to a particular malfunction associated with the vehicle. If the MIL has not been activated, then at block 1305 the Test Record stores the non-activated status of the MIL and then proceeds to block 1306 so that the system 10 can perform a check to determine whether an OBD simulation device is engaged to the OBD reader 46, rather than a real vehicle. An OBD simulation device can be used to circumvent the self-service emissions testing by operatively coupling a device that simulates the OBD-II of a vehicle. However, if at decision point 1303 it has been determined that the MIL has been activated, then the Test Record at block 1304 stores that the vehicle being tested has failed for a particular test parameter signaled by the MIL. After the failure of the test parameter has been recorded, the system 10 proceeds to block 1306 to determine if an OBD simulation device is engaged.

At decision point 1307, the system 10 determines whether the OBD simulation device was detected. If a simulation device was detected, then at block 1308 the Test Record stores that a real vehicle is being tested rather than an OBD simulation device and then proceeds to block 1309. However, if an OBD simulation device is not detected, then the system 10 goes directly to block 1309 such that the processor 35 obtains the Revolutions Per Minute (RPM) from the ECU of the OBD-II for the vehicle being tested. At decision point 1310, the system 10 determines whether the RPM value obtained is greater than zero. If the RPM value is greater than zero, then at block 1314 the Test Record stores the RPM value obtained from the ECU. At block 1315, the system 10 obtains a series of test results from the ECU to determine whether the ECU is capable of sending valid results to the processor 35. In other words, the system 10 determines if the vehicle is ready to be tested. At block 1316, the Test Record stores the results of a plurality of readiness test results. In one embodiment, the number of readiness test results is eleven, although any number of such tests may be obtained. At block 1317, the processor 35 obtains from the ECU the number and identity of one or more Diagnostic Trouble Codes (DTC) stored in the ECU. A DTC is a code stored in the ECU when a problem with the vehicle has been identified by the OBD-II of the vehicle being tested. At block 1318, the Test Record stores the number and nature of the DTC codes obtained through the ECU. At block 1319, the processor 35 obtains a module identification value from the ECU. The module identification value is a unique value assigned to an ECU by the manufacturer that associates the particular ECU with the vehicle's electrical system. The ECU in a single vehicle should have a unique module identification value. As such, when a message is communicated the ECU also transmits to the calling entity the ECU's module identification value in order to identify the particular ECU as well as the vehicle being tested. For example, a module may relate to the power train control for the vehicle being tested. Module identification provides an identification or description of the module to the processor 35. At block 1320, the Test Record stores the number and code types for the module identifications retrieved at block 1319. Once storage process of block 1319 is completed system 10 proceeds to block 1400 to perform the OPTIONAL DATA procedure.

However, if at decision point 1310 the RPM value of the vehicle being tested is not greater than zero, at decision point 1311, the system 10 determines whether the exception table stored in storage device 37 includes information that exempts the vehicle being tested from having an RPM value equal to zero. If so, the system 10 proceeds directly to block 1314 as discussed above. However, if the exception table does not include information that exempts the vehicle being tested, then monitor 24 displays a message to the user that the engine speed (e.g., rpm value) indicates the vehicle may not be running and queries the user if the testing procedure should continue. At decision point 1313, the system determines whether the user has selected for the testing to continue. If so, the system 10 proceeds to block 1314 as discussed above; however, if not, then at block 1321 the monitor 24 displays a message for the user to start the engine again. The system 10 then proceeds to block 1200 to again perform the OBD CONNECTION procedure.

Figure 20:
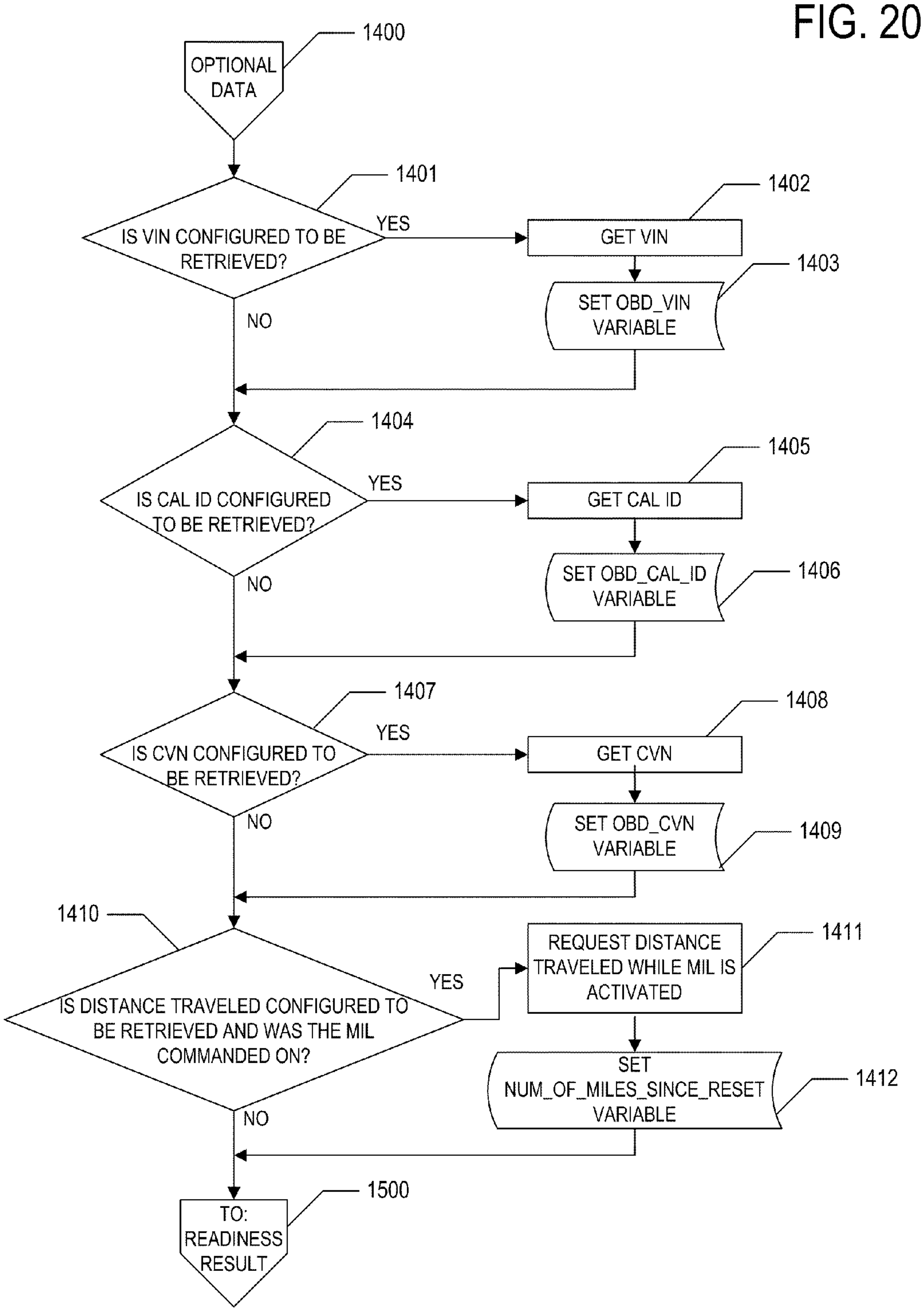
FIG. 20 is a flow chart illustrating one embodiment of an optional data request procedure for the self-service kiosk system.

Referring to FIG. 20, the OPTIONAL DATA REQUEST procedure is illustrated. At block 1400, the system 10 initiates the OPTIONAL DATA REQUEST procedure such that at decision point 1401 system 10 determines whether the self-service kiosk 12 is configured to include a barcode scanner 33 for retrieving VIN data from the vehicle to be tested. If the self-service kiosk 12 is not so configured, then the system 10 proceeds to decision point 1404. However, if the self-service kiosk 12 is so configured, the VIN data is retrieved at block 1402 and the Test Record stores the VIN data at block 1403.

After storing the VIN data, the system 10 proceeds to decision point 1404 to determine whether the self-service kiosk 12 is configured to retrieve the Calibration Identification in the ECU of the vehicle. As used herein, the term Calibration Identification shall mean a unique identifier that identifies the software installed in the ECU of the vehicle being tested. If the self-service kiosk 12 is not so configured, system 10 proceeds to decision point 1407. However, if the self-service kiosk 12 is so configured, the system 10 retrieves the Calibration Identification at block 1405 and the Test Record stores the Calibration Identification at block 1406.

At decision point 1407 the system 10 determines whether the self-service kiosk 12 is configured to retrieve a Calibration Verification Number (CVN) of the vehicle being tested. The Calibration Verification Number is an identification number that verifies if the OBD-II has been calibrated. In one embodiment, the CVN functions as a calibration verification number that is the result of a "check-sum" calculation performed on the calibration values stored in the ECU of the vehicle being tested. If the calibration values have not been changed, corrupted or modified, the CVN will always provide the same calibration verification number for a given software calibration set in the ECU. If any of the calibration values in the ECU have been modified or corrupted, the CVN calculation will generate an incorrect sum or CVN. If the self-service kiosk 12 is not configured to obtain the CVN then the system 10 proceeds directly to decision point 1410. However, if the self-service kiosk 12 is not configured to obtain the CVN, then the system 10 retrieves the CVN from the ECU at block 1408 and the Test Record stores the CVN at block 1409.

At decision point 1410 system 10 determines whether the vehicle being tested has been driven a predetermined number of miles with the MIL light on. If the vehicle has not been driven a predetermined number of miles with the MIL light on then system 10 proceeds to block 1500 for performing the READINESS RESULT procedure. However, if the vehicle has been driven a predetermined number of miles with the MIL light on, then the ECU is queried by system 10 on the actual distance traveled while the MIL light is activated at block 1411 and the Test Record stores the number of miles driven at block 1412. Once the information is recorded, system 10 proceeds to block 1500 to perform the READINESS RESULT procedure.

Figure 21:
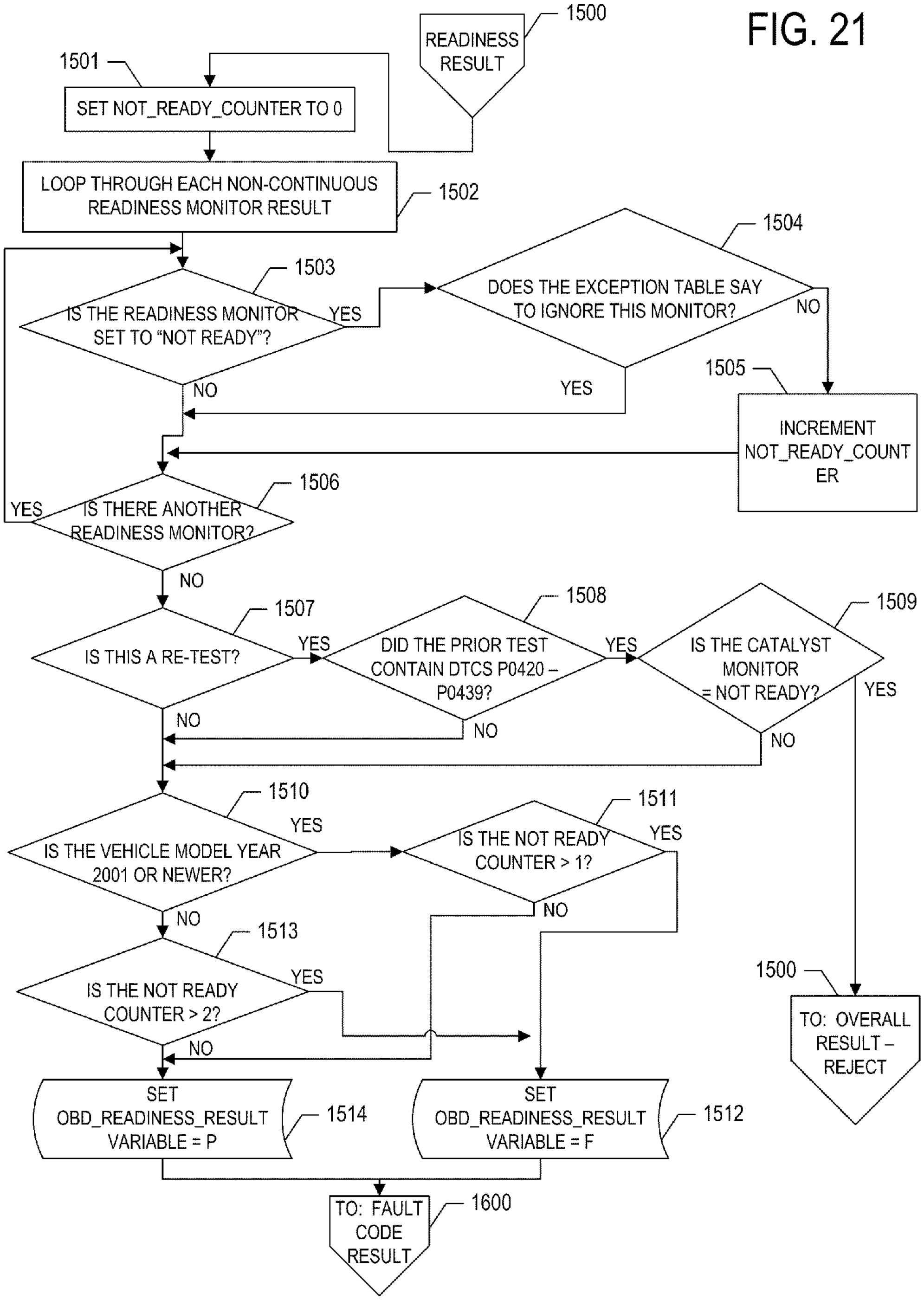
FIG. 21 is a flow chart illustrating one embodiment of a readiness result procedure for the self-service kiosk system.

Referring to FIG. 21, the READINESS RESULT procedure is illustrated. At block 1501 system 10 sets the Not Ready Counter to zero and then checks through each non-continuous readiness monitor result at block 1502. In one embodiment, system 10 includes eleven types of readiness test results that fall into two categories—continuous tests and non-continuous tests. Non-continuous tests are set to "not ready" status when a certain event occurs, such as the battery of the vehicle becoming disconnected, which is recorded and retrieved by the processor 35 of the self-service kiosk 12. At decision point 1503, system 10 determines for each non-continuous test whether any of the readiness monitors are set to "not ready" status. If not, system 10 proceeds directly to decision point 1506. However, if any of the readiness monitors are set to "not ready" status then at decision point 1504 system 10 determines whether the OBD-II exception table stored in a database of storage device 37 includes information to ignore the "not ready" status of a particular readiness monitor detected by system 10. If such information is not found in the exception table then at block 1505 a Not Ready Counter is set at an increment of one and the system 10 proceeds to decision point 1506. However, if such information is found in the exception table the system 10 proceeds directly to decision point 1506.

At decision point 1506, system 10 determines whether another readiness monitor is retrieved from the ECU. If so, system 10 loops back to decision point 1503 to determine if that readiness monitor has a "not ready" status. However, if no further readiness monitors are retrieved, then at decision point 1507 system 10 determines whether the vehicle being tested failed or was rejected during a previous emissions testing. If so, system 10 determines at decision point 1508 whether any of the prior emissions tests included DTCs related to the catalytic converter of the vehicle being tested. If no such codes are retrieved, system 10 proceeds directly to decision point 1510. However, if such codes are retrieved then at decision point 1509 system 10 determines whether the catalyst monitor has a "not ready" status. If not, system 10 proceeds directly to decision point 1510; however, if the catalyst monitor has a "not ready" status then Test Record stores a rejection status for the vehicle being tested.

At decision point 1510, system 10 determines whether the vehicle being tested is a model year 2001 or later. If not, then system 10 proceeds directly to decision point 1513; however, if the vehicle is a model year 2001 or later then at decision point 1511 system 10 determines whether the Not Ready Counter is greater than a value of one. If not, system 10 proceeds to directly to block 1514 so that the Test Record stores that the vehicle being tested has passed the OBD READINESS RESULT procedure before proceeding to block 1600. However, if the Not Ready Counter does exceed the value of one then the Test Record stores the failure result at block 1512 before proceeding to FAULT TEST RESULT procedure at block 1600.

Figure 22:
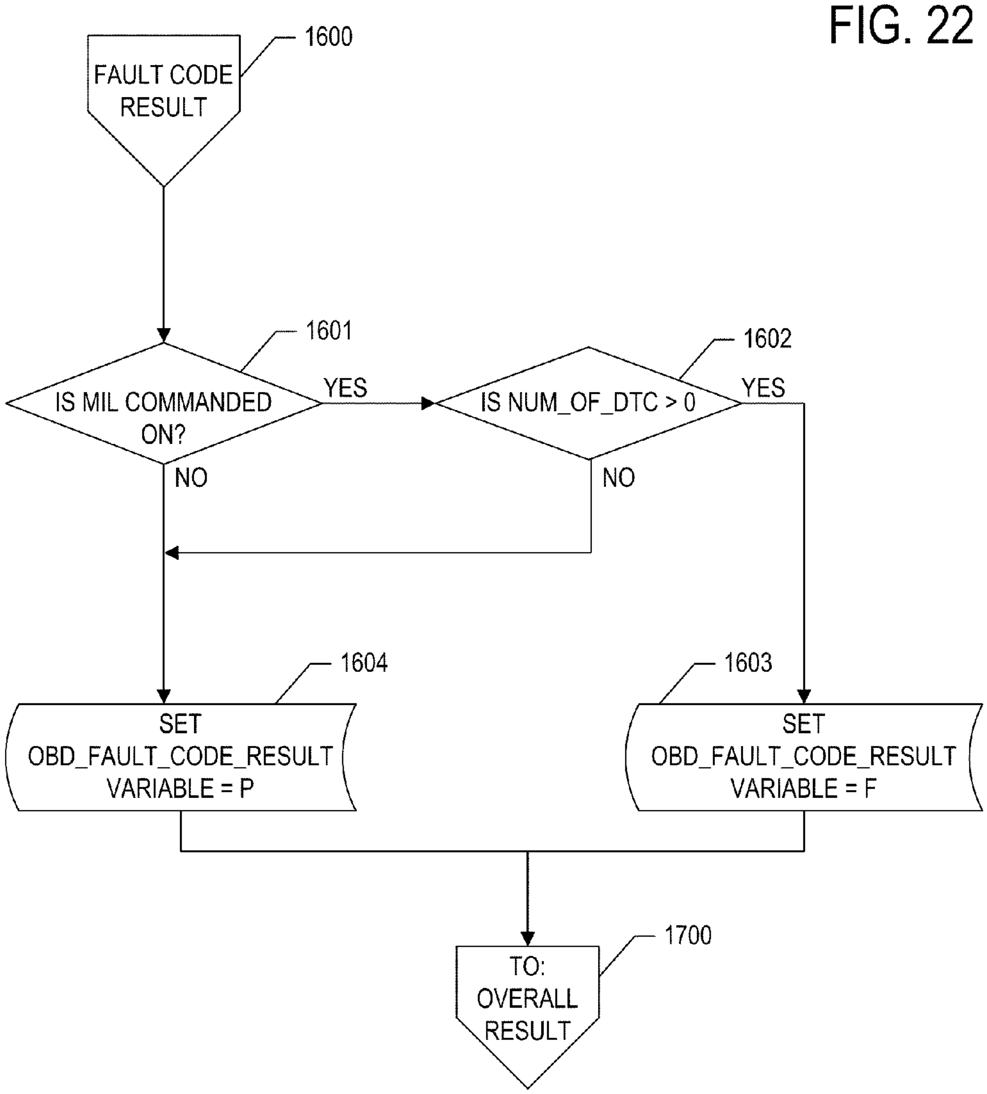
FIG. 22 is a flow chart illustrating one embodiment of a fault code result procedure for the self-service kiosk system.

Referring to FIG. 22, the FAULT TEST RESULT procedure is illustrated. After the FAULT TEST RESULT is initiated at block 1600 system 10 determines at decision point 1601 whether the MIL light has been activated. If the MIL light has been activated, then at decision point 1602 system 10 determines whether the number of DTCs retrieved from the ECU is greater than a value of zero. If the number of retrieved DTCs does not exceed zero, the Test Record stores the passing status for the vehicle being tested; however, if the number of DTCs does exceed zero than the Test Record stores the failing status for the vehicle being tested before system 10 proceeds to block 1700 to perform the OVERALL OBD RESULT procedure.

Figure 23:
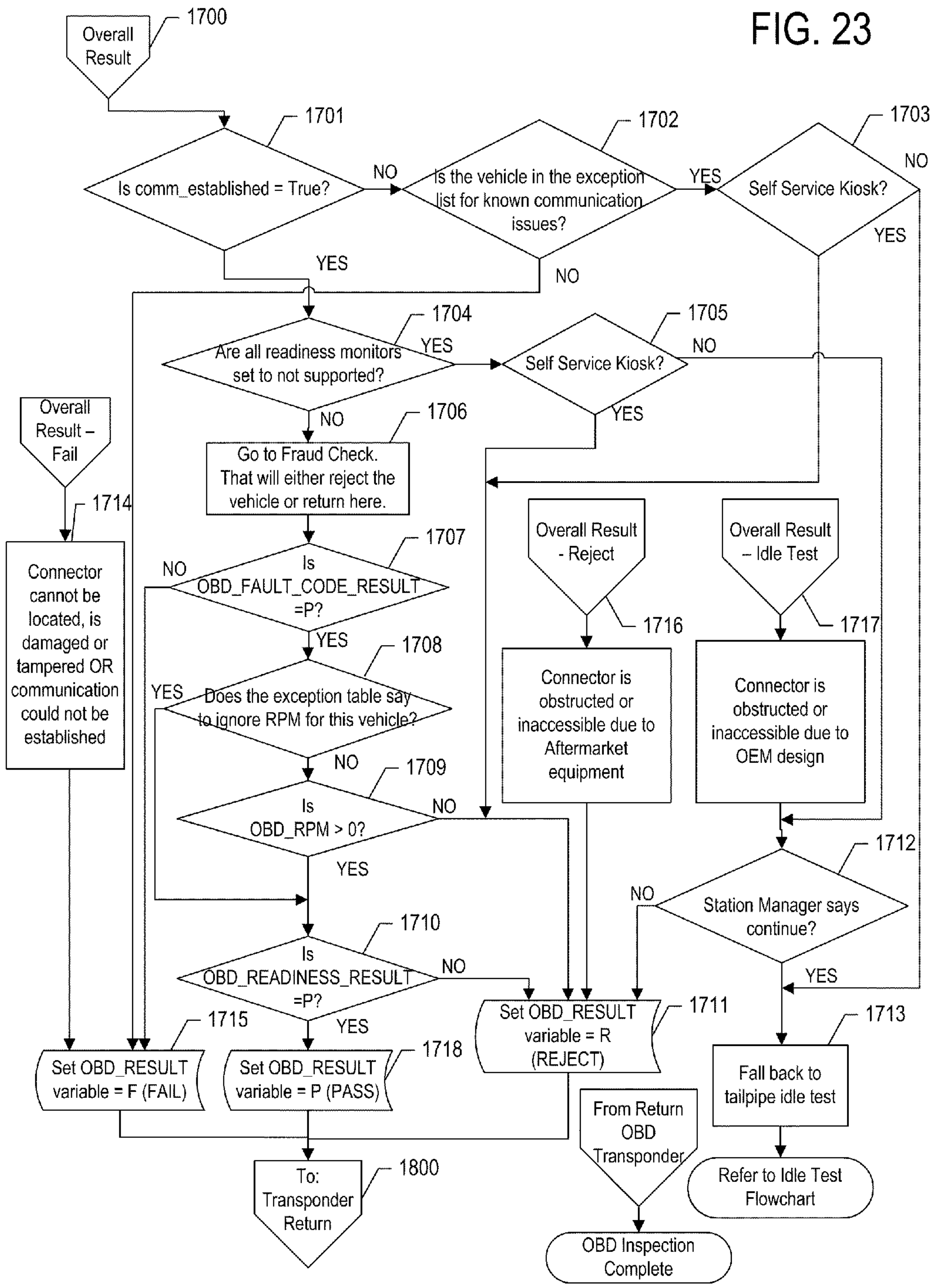
FIG. 23 is a flow chart illustrating one embodiment of an overall OBD result procedure for the self-service kiosk system.

At FIG. 23, the OVERALL OBD RESULT procedure is illustrated. At decision point 1701, system 10 determines whether communication has been established with the OBD-II for the vehicle being tested. If no communication has been established then at decision point 1702 system 10 determines whether the vehicle being tested is included in an exception list contained in the storage device 37 for vehicles having known communication issues. If the vehicle is included on the exception list then at decision point 1703 system 10 determines whether the self-service kiosk 12 is in self-service mode. If the self-service kiosk 12 is not in the self-service mode then the user is instructed at block 1713 to utilize the tailpipe idle test for vehicle emissions testing. However, if the self-service kiosk 12 is in the self-service mode, then at block 1711 the Test Record stores the rejection status for the vehicle being tested.

At decision point 1702, if the vehicle is not on the exception list then system 10 proceeds directly to block 1715 for the Test Record to store the failure status of the OVERALL OBD procedure.

At decision point 1701, if communication has been established with the OBD-II of the vehicle then at decision point 1704 system 10 determines if the readiness monitors are supported by the self-service kiosk 12. If the monitors can be supported, then at decision point 1705, system 10 determines whether the self-service kiosk 12 is in self-service mode. If not, system 10 proceeds to decision point 1712 to determine whether the attendant can continue with the vehicle emissions testing. If so, then at block 1713 the attendant conducts a tailpipe idle test. However, if the attendant cannot continue with the vehicle emission testing at decision point 1712 the Test Record stores that rejection status for the vehicle being tested. After the rejection status has been stored, system 10 proceeds to block 1800 to perform the TRANSPONDER TEST procedure.

At decision point 1704, if the readiness monitors are not supported by the self-service kiosk 12, then at block 1706 system 10 conducts a FRAUD CHECK procedure in which the vehicle being tested is either rejected or approved. If the vehicle is approved after the FRAUD CHECK procedure system 10 then proceeds to decision point 1707 to determine whether the vehicle passed the OBD FAULT CODE RESULT procedure. If the vehicle did not pass, then the Test Record stores the failure status at block 1715. However, if the vehicle did pass then at decision point 1708 system 10 determines whether the exception table includes information to ignore the RPM value of the vehicle being tested. If the exception table does not include such information the system proceeds directly to decision point 1710. However, if the exception table does include such information, then at decision point 1709 system 10 determines whether the OBD RPM is greater than a value of zero. If not, the Test Record stores the rejection status of the OBD RESULT at block 1711. If the OBD RPM is greater than a value of zero, then at decision point 1710, system 10 determines whether the vehicle has a passing status for the OBD READINESS RESULT. If the vehicle has not passed, then the Test Record stores the rejection status of the OBD RESULT at block 1711. However, if the vehicle has passed, then the Test Record stores the passing status at block 1718 and then system 10 proceeds to conduct the TRANSPONDER RETURN procedure at block 1800.

As further shown, if the vehicle being tested has a failure status for the OVERALL RESULT, system 10 at block 1714 concludes that the OBD reader 46 cannot be located, the OBD reader 46 is damaged, or communication with the OBD-II of the vehicle being test cannot be established then at block 1715 the Test Record stores a failure status for the OBD RESULT procedure. In addition, if the vehicle being tested has a rejected status for the OVERALL RESULT, system 10 at block 1716 confirms whether the OBD connection site on the vehicle is obstructed or inaccessible due to aftermarket equipment. At block 1711, the Test Record stores the rejection status of the vehicle being tested and system 10 then proceeds to conduct the TRANSPONDER RETURN procedure at block 1800. Finally, if the vehicle being tested may require a tailpipe idle test then at block 1717 system 10 confirms if the OBD connection site on the vehicle is obstructed or inaccessible due to OEM design of the vehicle being tested. System 10 then proceeds to decision point 1712 to determine whether the user wishes to continue with a tailpipe idle test. If so, the tailpipe idle test is conducted by an attendant or other authorized personnel at block 1713.

Figure 24:
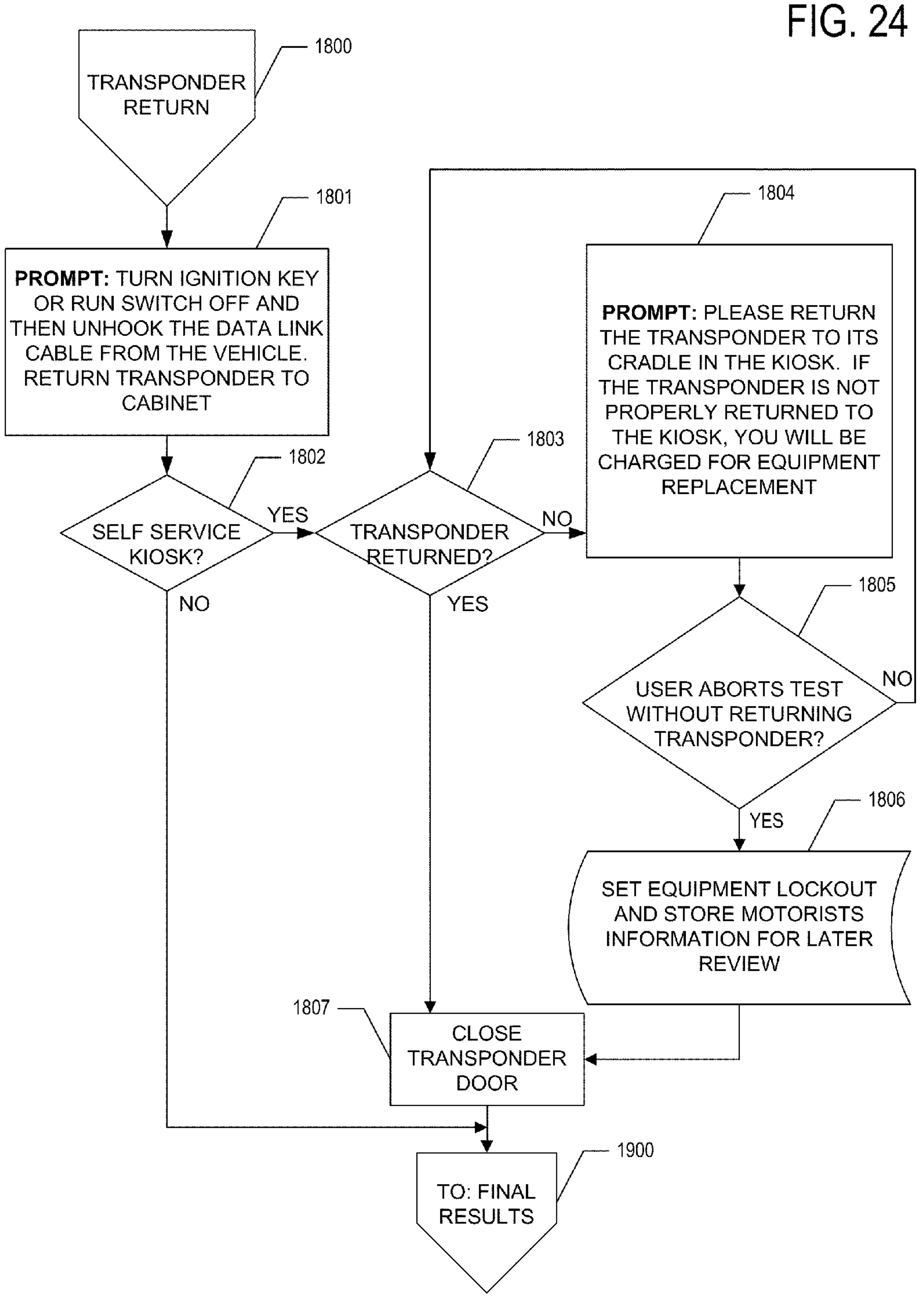
FIG. 24 is a flow chart illustrating one embodiment of a transponder return procedure for the self-service kiosk system.

Referring to FIG. 24, the TRANSPONDER RETURN procedure is illustrated. At block 1801, the monitor 24 displays a prompt for the user to turn off or run switch off and then unhook the OBD reader 46 from the OBD connection site on the vehicle and return the OBD reader 46 to the self-service kiosk 12. At decision point 1802, system 10 determines whether the self-service kiosk 12 is in a self-service mode. If not, system 10 proceeds directly to block 1900 for conducting the FINAL RESULTS procedure. However, if the self-service kiosk 12 is not in the self-service mode then at decision point 1803 system 10 determines whether the OBD reader 46 (also referred to as a transponder) has been returned to the self-service kiosk 12. If the OBD reader 46 has been returned to the OBD interface 29 of the self-service kiosk 12 then system 10 proceeds directly to block 1807 for causing the security door 30 to close before proceeding to block 1900. However, if OBD reader 46 has not been returned to the OBD interface, then at block 1804 the monitor 24 displays a prompt for the user to return the OBD reader 46 to the OBD interface of the self-service kiosk 12 and that the user will be charged for equipment replacement.

At decision point 1805, system 10 determines whether user has aborted the vehicle emissions testing without returning the OBD reader 46 to the OBD interface. If the user did not abort the test without returning the OBD reader 46 then system 10 return to decision point 1803 to determine if the OBD reader 46 has been returned. However, if the user did abort the test without returning the OBD reader 46, then the processor 35 actuates a lockout of the self-service kiosk 12 and the Test Record stores user's information for later review. System 10 then returns to block 1807 for closing security door 30 before proceeding to block 1900.

Figure 25:
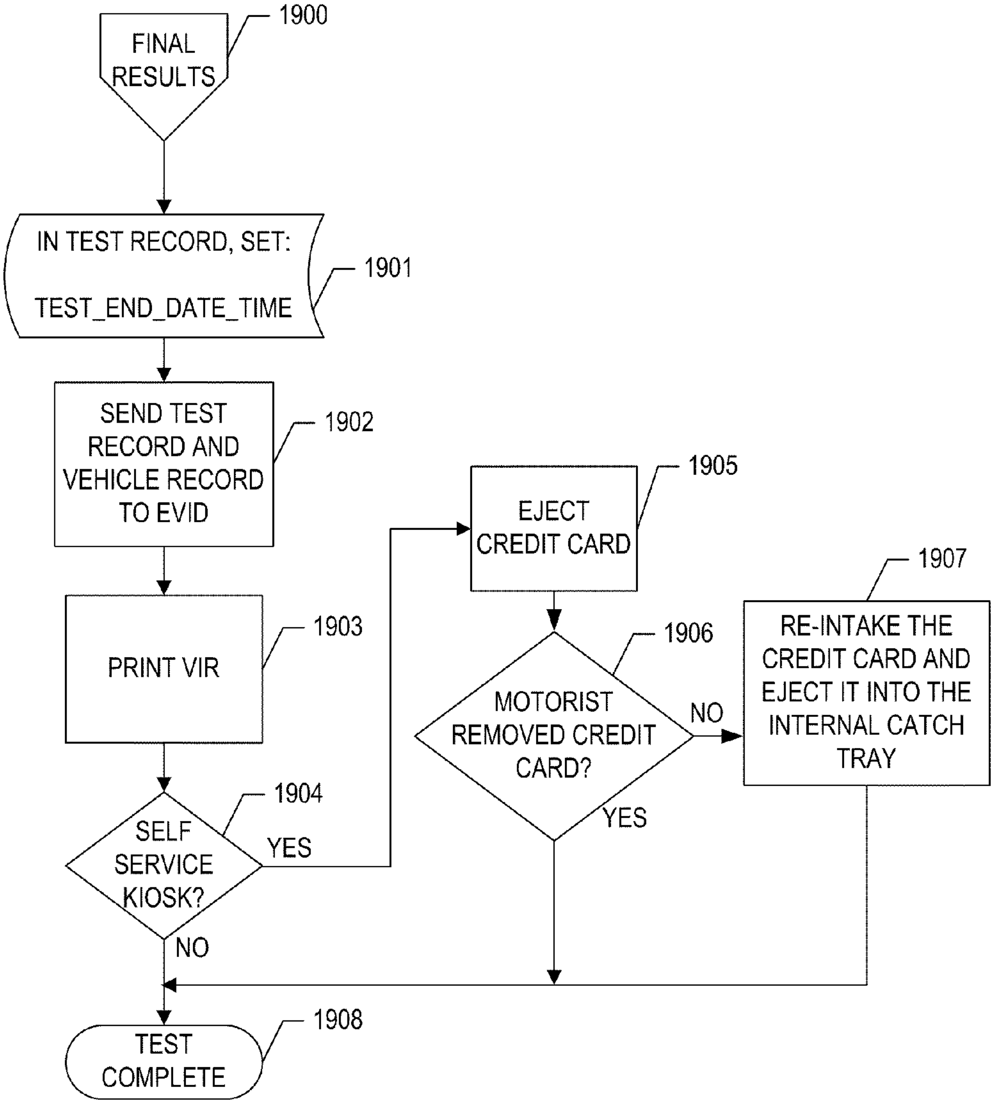
FIG. 25 is a flow chart illustrating one embodiment of final results procedure for the self-service kiosk system.

Referring to FIG. 25, the FINAL RESULT procedure is illustrated. At block 1901 the Test Record stores the vehicle emissions testing end date and time. At block 1903 system 10 transmits the Test Record and Vehicle Record to the vehicle information database 14. At block 1904 system 10 instructs printer 22 to print out the registration renewal tag for the user before proceeding to decision point 1904 to determine whether the self-service kiosk 12 is in the self-service mode. If not, the test has been completed at block 1908. However, if the self-service kiosk 12 is in the self-service mode, then the processor 35 instructs the credit card reader 26 to eject the user's credit card. At decision point 1906, system 10 determines whether the user has removed the credit card from the credit card reader 26. If not, processor 35 instructs the credit card reader 26 to eject the credit card into an internal catch tray (not shown) and the vehicle emission testing has been completed at block 1908.

Figure 26:
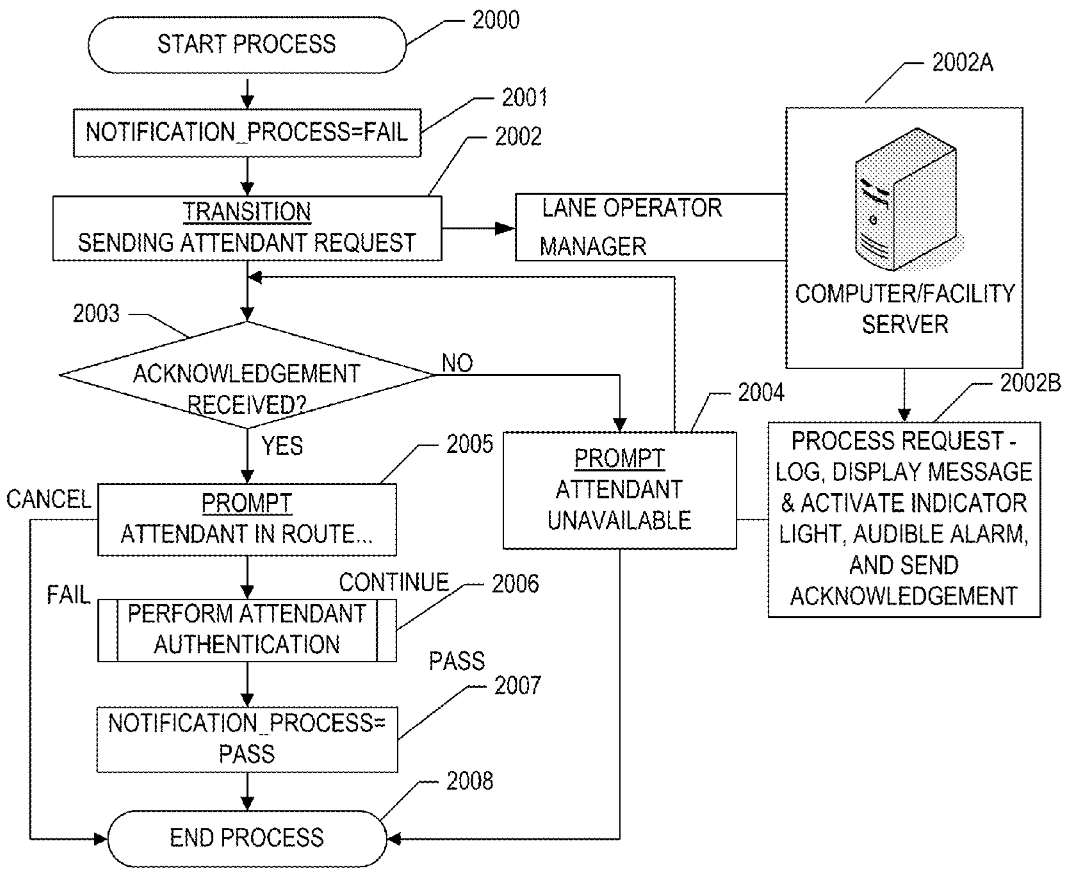
FIG. 26 is a flow chart illustrating one embodiment of the attendant alert process procedure for the self-service kiosk system.

Referring to FIG. 26, the ATTENDANT ALERT PROCESS procedure is illustrated. At block 2000, system 10 initiates the ATTEND ALERT PROCESS procedure. At block 2001, once the process is initiated, system 10 confirms that the notification process has failed before proceeding to block 2002 wherein system 10 transmits an Attendant Request to an offsite facility computer server at block 2002A directed to either the lane operator or manager of the facility. At block 2002B, processor 35 logs Attendant Request, monitor 24 displays a message to the attendant, or activates an indicator light or audible alarm such that the attendant returns an acknowledgement to the user.

At decision point 2003, system 10 determines whether the acknowledgement has been received. If no acknowledgement has been received, then at block 2004 the monitor 24 displays a prompt to the user that the attendant is unavailable. However, if the acknowledgement has been received, then monitor 24 at block 2005 displays a prompt to the user that the attendant is in route to the self-service kiosk 12. If the prompt to the attendant being in route is cancelled then system 10 proceeds to block 2008 to end the ATTENDANT ALERT PROCESS procedure. At block 2006, system 10 performs an attendant authentication process. If the attendant authentication process fails then system 10 proceeds to block 2008 to end the ATTENDANT ALERT PROCESS procedure.

Figure 27:
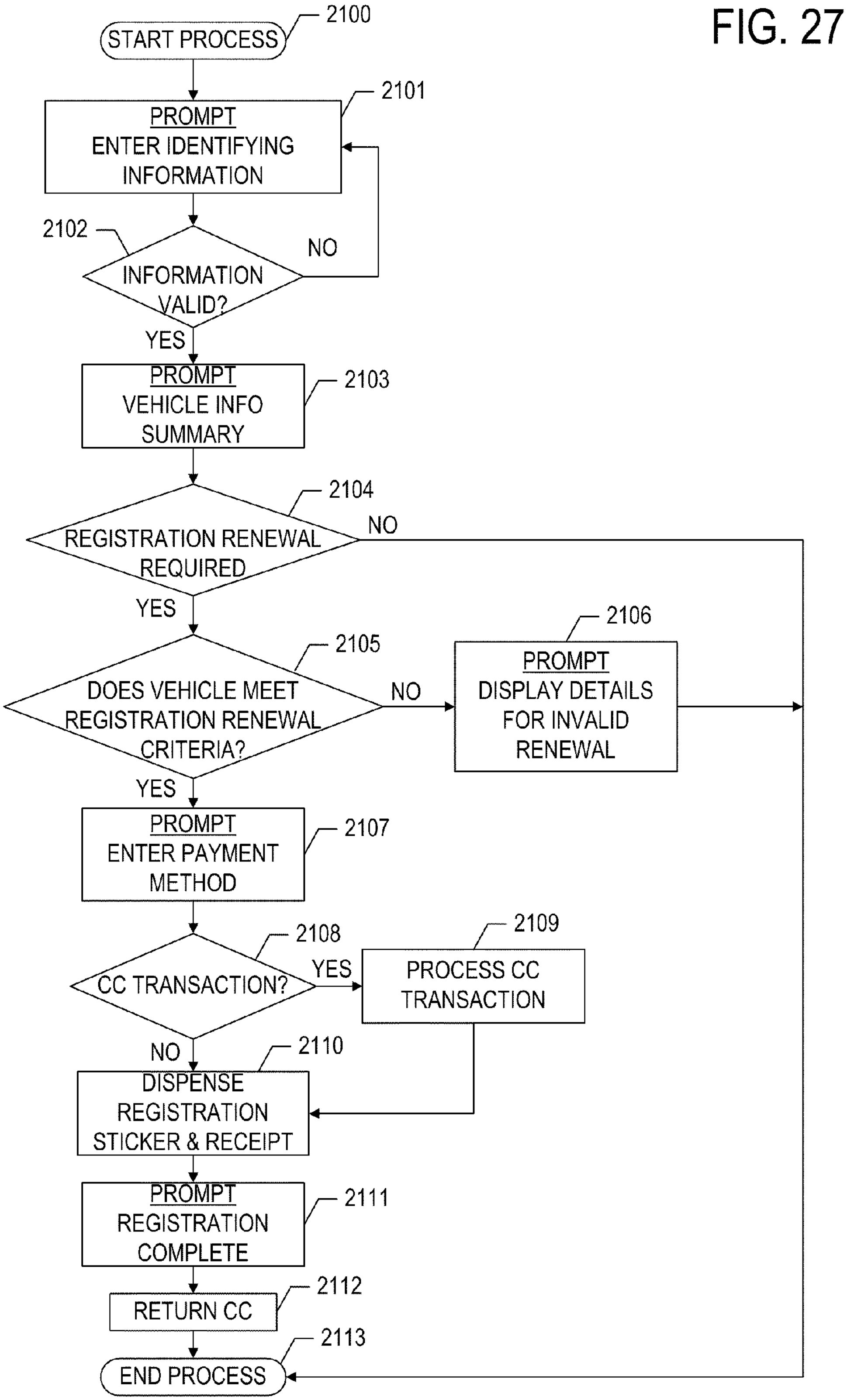
FIG. 27 is a flow chart illustrating one embodiment of the attend alert process procedure for the self-service kiosk system.

Referring to FIG. 27, the REGISTRATION RENEWAL procedure is illustrated. At block 2100, system 10 initiates the REGISTRATION RENEWAL procedure. At block 2101, once the procedure is initiated monitor 24 displays a prompt for the user to enter identifying information, such as a combination of various values to properly identify the owner and/or vehicle being tested including, but not limited to, VIN, license, registration number, owner name, owner address, and county of registration. At decision point 2102, system 10 determines whether the identifying information is valid. If the identifying information is not valid, then system 10 returns to block 2101; however, if the identifying information is valid then at block 2103 monitor 24 displays a prompt for the user to verify the vehicle information summary.

At decision point 2104, system 10 determines whether a registration renewal of the vehicle being tested is required. If a registration renewal is not required system 10 proceeds directly to block 2113 to terminate the REGISTRATION RENEWAL procedure; however, if the registration renewal is required, then at decision point 2105 system 10 determines whether the vehicle being tested meets a predetermined registration renewal criteria stored in the storage device 10. If the vehicle does not meet registration renewal criteria the monitor 24 at block 2106 displays the details for an invalid registration renewal before terminating the REGISTRATION RENEWAL procedure at block 2113. However, if the vehicle does meet the registration renewal criteria, the monitor 24 displays a prompt for the user to enter the payment method into the self-service kiosk 12 at block 2107.

At decision point 2108, system 10 determines whether the user will be conducting a credit card transaction to pay for the registration renewal. If a credit card transaction is being made then at block 2109 system 10 processes the credit card transaction using the credit card reader 26 and then proceeds to block 2110. However, if a credit card transaction is not being made, system 10 proceeds directly to block 2110 so that the system 10 instructs the printer 22 to print out a registration renewal sticker, registration document and/or receipt. The system 10 may further print out state regulated permits, such as burning permits, hunting permits, fishing license, state park permit, although other types of state regulated permits normally issued by the state are contemplated. At block 2112, monitor 24 displays a prompt that the registration renewal process has been completed and returns the credit card to the user at block 2112 such that the REGISTRATION RENEWAL procedure has been completed at block 2113.

It should be understood from the foregoing that, while particular embodiments are illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A self-service kiosk comprising:

a standalone cabinet including a computer having a processor for processing information, a storage device for storing information related to a vehicle record and/or a test record for a vehicle being tested, and a printer for printing one or more documents, the standalone cabinet further including a vehicle information number (VIN) reader for retrieving vehicle information related to the vehicle being tested, an on-board diagnostic (OBD) reader for retrieving information from an OBD system of the vehicle being tested, and a security feature for reducing tampering with the standalone cabinet, the security feature comprising a security door assembly including a first sliding door configured to selectively shield the OBD reader and a second sliding door of the security door assembly configured for selectively shielding the VIN reader; and wherein the computer is responsive to conducting an emissions testing of the vehicle being tested such that the vehicle being tested is provided either a rejecting status or passing status by the computer based on results of the emissions testing, wherein if the vehicle being tested is provided a passing status by the computer for the emissions testing of the vehicle being tested, the computer instructs the printer to print out a registration renewal sticker signifying a passing status of the vehicle being tested.

2. The self-service kiosk of claim 1, wherein the computer determines whether the vehicle is provided either a rejecting status or a passing status based predetermined criteria for registration renewal.

3. The self-service kiosk of claim 1, further comprising a fingerprint scanner for capturing a fingerprint of a user.

4. The self-service kiosk of claim 3, wherein the fingerprint of the user is transmitted to the storage device for comparison by the processor with a fingerprint of the user that is previously stored in the storage device for authenticating the fingerprint of the user.

5. The self-service kiosk of claim 4, wherein if the fingerprint of the user transmitted to the storage device does not match the fingerprint of the user stored in the storage device then an identity of the user is not authenticated.

6. The self-service kiosk of claim 3, wherein the first sliding door is configured to selectively open after user identification has been established via the fingerprint scanner.

7. The self-service kiosk of claim 1, wherein the processor instructs the printer to print out one or more state regulated permits and/or licenses.

8. The self-service kiosk of claim 7, wherein the one or more state regulated permits and/or licenses is a hunting permit.

9. The self-service kiosk of claim 7, wherein the one or more state regulated permits and/or licenses is a fishing license.

10. The self-service kiosk of claim 7, wherein the one or more state regulated permits and/or licenses is a state park permit.

11. The self-service kiosk of claim 7, wherein the one or more state regulated permits and/or licenses is a burning permit.

12. The self-service kiosk of claim 1, further comprising a credit card reader for accepting a payment for conducting the emissions testing.

13. The self-service kiosk of claim 1, wherein the security feature comprises a camera, an anti-tampering module, a security door assembly, or combinations thereof.

14. The self-service kiosk of claim 1, further comprising:

wherein the VIN reader comprises a barcode scanner housed in a recess of the standalone cabinet for reading a VIN of the vehicle being tested such that the second sliding door of the security door assembly selectively shields the barcode scanner.

15. The self-service kiosk of claim 1, wherein the security feature further comprises an anti-tampering module that prevents tampering to the self-service kiosk including a circuit board assembly with firmware for detecting actuation of one or more switches, wherein the circuit board assembly is configured to transmit an event to the computer upon a change in a state of the one or more switches and the computer is configured to lockout the self-service kiosk or display a notification based upon the event.

16. A self-service kiosk for conducting emissions testing and registration renewal comprising:

a standalone cabinet including a processor for processing information, and a storage device for storing information related to a vehicle record and/or a test record for a vehicle being tested, the standalone cabinet further including a vehicle information number (VIN) reader for retrieving vehicle information related to the vehicle being tested, an on-board diagnostic (OBD) reader for retrieving information from an OBD system of the vehicle being tested, a holster comprising a sensor configured to detect return of the OBD reader, and a security feature for reducing tampering with the stand-alone cabinet, the security feature comprising a security door assembly including a first sliding door configured to selectively shield the OBD reader when the sensor detects the OBD reader has been returned to the holster; and wherein the processor is responsive to conducting an emissions testing of the vehicle being tested such that the vehicle being tested is provided with either a rejecting status or passing status based on information from the OBD system of the vehicle being tested, wherein if the vehicle being tested is provided a passing status for the emissions testing of the vehicle being tested, the processor generates a registration renewal for the vehicle being tested and stores the registration renewal in the storage device.

17. The self-service kiosk of claim 16, further comprising a printer responsive to the processor for printing out a registration renewal sticker for the vehicle being tested if a registration renewal is generated by the processor.

18. The self-service kiosk of claim 16, wherein the registration renewal is generated by the processor if the vehicle being tested meets registration renewal criteria stored in the storage device.

19. The self-service kiosk of claim 17, wherein the printer prints out a registration renewal document signifying a registration renewal status for the vehicle being tested.

20. The self-service kiosk of claim 16, wherein the security feature comprises a camera, an anti-tampering module, a security door assembly, or combinations thereof.

* * * * *